United States Patent
Kim et al.

(10) Patent No.: US 10,219,193 B2
(45) Date of Patent: Feb. 26, 2019

(54) METHOD AND APPARATUS FOR PROVIDING SERVICES OF NETWORK TO TERMINAL BY USING SLICE

(71) Applicant: Samsung Electronics Co., Ltd., Gyeonggi-do (KR)

(72) Inventors: Sunghoon Kim, Seoul (KR); Jungje Son, Yongin-si (KR); Hoyeon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/683,668

(22) Filed: Aug. 22, 2017

(65) Prior Publication Data

US 2018/0054765 A1    Feb. 22, 2018

(30) Foreign Application Priority Data

Aug. 22, 2016 (KR) .................. 10-2016-0106342
Aug. 21, 2017 (KR) .................. 10-2017-0105445

(51) Int. Cl.
| | |
|---|---|
| *H04W 36/06* | (2009.01) |
| *H04W 4/02* | (2018.01) |
| *H04W 36/32* | (2009.01) |
| *H04W 4/70* | (2018.01) |
| *H04W 88/02* | (2009.01) |

(Continued)

(52) U.S. Cl.
CPC ............. *H04W 36/06* (2013.01); *H04W 4/02* (2013.01); *H04W 4/70* (2018.02); *H04W 36/32* (2013.01); *H04L 67/12* (2013.01); *H04W 4/06* (2013.01); *H04W 36/22* (2013.01); *H04W 84/042* (2013.01); *H04W 88/02* (2013.01)

(58) Field of Classification Search
CPC ......... H04W 36/06; H04W 4/70; H04W 4/02; H04W 36/32; H04W 4/06; H04W 36/22; H04W 84/042; H04W 88/02; H04L 67/12
See application file for complete search history.

(56) References Cited

U.S. PATENT DOCUMENTS

| | | | |
|---|---|---|---|
| 2017/0303259 A1* | 10/2017 | Lee ..................... | H04W 28/16 |
| 2017/0339609 A1* | 11/2017 | Youn .................... | H04W 76/11 |

OTHER PUBLICATIONS

S2-164649 "CCNF and NSI Relocation," Aug. 29-Sep. 2, 2016, 3GPP.*

(Continued)

*Primary Examiner* — Jae Y Lee

(57) ABSTRACT

The present disclosure relates to a communication technique of fusing a 5G communication system for supporting higher data transmission rate beyond a 4G system with an IoT technology and a system thereof. The present disclosure may be applied to intelligent services (e.g., smart home, smart building, smart city, smart car or connected car, health care, digital education, retail business, security and safety related service, or the like) based on the 5G communication technology and the IoT related technology. A communication method of a CCNF comprises detecting a CCNF relocation necessity situation, determining a new CCNF, and transmitting a CCNF relocation request message including information on a terminal being served by the CCNF to the new CCNF The method further comprises receiving a CCNF relocation response message from the new CCNF, and performing a location update procedure with the terminal according to a predetermined condition.

20 Claims, 20 Drawing Sheets

(51) Int. Cl.
    *H04L 29/08*     (2006.01)
    *H04W 84/04*     (2009.01)
    *H04W 36/22*     (2009.01)
    *H04W 4/06*     (2009.01)

(56) References Cited

OTHER PUBLICATIONS

R3-161861 "Solution for Selection of Network Slice and CN entity," Aug. 22-26, 2016, 3GPP.*
Nokia, et al., "Solution for Selection of Network Slice and CN entity", 3GPP TSG-RAN WG3 Meeting #93; R3-161861; Gothenburg, Sweden, Aug. 22-26, 2016. (9 pages).
Qualcomm Incorporated, "Network Slice Selection", 3GPP TSG-RAN WG3 Meeting #93; R3-161665; Gothenburg, Sweden, Aug. 22-26, 2016. (4 pages).
ZTE, "Clarification on Network Slicing in RAN", 3GPP TSG-RAN WG3 Meeting #92; R3-161106; Nanjing, China, May 23-27, 2016. (5 pages).
CMCC, "Definition of RAN Network slicing and Network Functions", 3GPP TSG-RAN WG2 Meeting #92; R3-161268; Nanjing, China, May 23-27, 2016. (5 pages).
Ericsson, "Network Slice Selection for 5G", 3GPP TSG-RAN WG3 #93; R3-161889; Gothenburg, Sweden, Aug. 22-26, 2016. (8 pages).
International Search Report for International Application No. PCT/KR2017/009099, dated Nov. 29, 2017. (3 pages).

\* cited by examiner

When it happens?
1. overload/congestion situation
2. If CCNF is located in Edge cloud, it can be re-located based on UE location

FIG. 14

| NSI ID | Service type |
|---|---|
| NSI #1 | eMBB |
| NSI #2 | none |
| NSI #3 | none |

| NSI ID | Service type |
|---|---|
| NSI #1 | eMBB |
| NSI #2 | mIoT |
| NSI #3 | none |

| NSI ID | Service type |
|---|---|
| NSI #1 | none |
| NSI #2 | mIoT |
| NSI #3 | none |

METHOD AND APPARATUS FOR PROVIDING SERVICES OF NETWORK TO TERMINAL BY USING SLICE

CROSS-REFERENCE TO RELATED APPLICATION AND CLAIM OF PRIORITY

This application is related to and claims priority to Korean Patent Application No. 10-2016-0106342 filed on Aug. 22, 2016 and Korean Patent Application No. 10-2017-0105445 filed on Aug. 21, 2017 the contents of which are incorporated herein by reference.

TECHNICAL FIELD

The present disclosure relates to a method and apparatus for providing services of network to terminal by using slicing.

BACKGROUND

In order to meet the increasing demand for wireless data traffic since the commercialization of 4th generation (4G) communication systems, the development focus is on the 5th generation (5G) or pre-5G communication system. For this reason, the 5G or pre-5G communication system is called beyond 4G network communication system or post long-term evolution (LTE) system.

Consideration is being given to implementing the 5G communication system in millimeter wave (mmW) frequency bands (e.g., 60 GHz bands) to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna.

Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM) and sliding window superposition coding (SWSC) as advanced coding modulation (ACM), filter bank multi-carrier (FBMC), non-orthogonal multiple access (NOMA), and sparse code multiple access (SCMA).

The 5G system will support more diverse services in comparison with the legacy 4G systems. Examples of representative services are enhanced mobile broad-band (eMBB), ultra-reliable and low latency communication (URLLC), massive machine type communication (mMTC), and evolved multimedia broadcast/multicast service (eMBMS). A system supporting the URLLC service may be called URLLC system, and a system supporting the eMBB service may be called eMBB system. The terms "service" and "system" may be interchangeably used.

Among these services, the URLLC service is newly considered for the 5G system, while not being considered for 4G systems, and has requirements of ultra-reliability (e.g., packet error rate of about 10-5) and low latency (e.g., about 0.5 msec). In order to meet such demanding requirements, the URLLC service may be provided with a transmission time interval (TTI) shorter than that of the eMBB service in consideration of various operation schemes.

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies.

In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

In line with the application of IoT technologies to various fields, communication operators and vendors are eager to develop various IoT-based applications and systems. Among many IoT solutions, the licensed band cellular IoT (CIoT) is coming into the spotlight. This is because the cellular system operating on the licensed frequency band is more reliable than the non-cellular system and, as a consequence, guarantees more reliable services. For CIoT, eMTC and GSM/EDGE radio access network (GERAN) CIoT are under discussion in the standardization process, which is largely affected by the needs of communication operators.

Advanced communication technologies make it possible to allow communications among all things as well as persons, and this feature is represented by IoT. For example, a user may carry different types of multiple electronic devices, which may connect to each other through cellular communication, short range communication, and sensing technology links for implementing functions for user convenience and accomplishing efficient inter-device control. Such electronic devices may be commonly called IoT devices. Another exemplary IoT service may be implemented in the meter reading service with measurement devices which read for electricity and water and deliver the read values through a network. Another exemplary IoT service may be implemented in such a way of installing IoT devices to monitor public places or remote areas for public safety such that the devices detect occurrence of a specific event and notify the progress of the event through a network. Still another exemplary IoT service may be implemented in such a way that home electric appliances equipped with a communication function are deployed to report their operation status and the user may make a device trigger to command the electric appliance to perform a specific operation.

An IoT device includes a cellular communication module such as an LTE module or a short-range communication module such as a Bluetooth, a wireless local area network (WLAN) or wireless fidelity (Wi-Fi) module, a Zigbee module, and a near field communication (NFC) module. An LTE terminal may be configured to operate on an LTE carrier frequency and/or an industrial, scientific, and medical (ISM) band.

There are various attempts to apply the IoT to the 5G communication system. For example, the sensor network, Machine to Machine (M2M), and Machine Type Communication (MTC) technologies are implemented by means of 5G communication technologies such as beamforming, MIMO, and array antenna. The application of the aforementioned cloud RAN as a big data processing technology is an example of convergence between the 5G and IoT technologies.

Throughout the specification of the present disclosure, CIoT denotes an IoT service over a cellular network. The cellular network means a mobile communication network such as a 2G network represented by GERAN, a 3G network represented by GPRS, and a 4G network represented by LTE. The CIoT service means a cellular service for supporting the IoT terminals or a service for transmitting small size data through the cellular network. The CIoT service may include Machine Type Communication (MTC) services. The cellular network is intended to include core networks and radio access networks.

In the present disclosure, SCEF is an abbreviation of service capability exposure function defined in the 3rd generation partnership project technical specification (3GPP TS) 23.628. Also, SCS/AS is an abbreviation of service capability server/application server supporting various SCEF-based services.

SUMMARY

To address the above-discussed deficiencies, it is a primary object to provide a data transmission procedure of a terminal and network device for supporting IoT over a cellular network.

Also, the present disclosure aims to provide an IoT data multicast/broadcast configuration procedure among an SCEF, a mobility management entity (MME), and a home subscriber server (HSS).

Also, the present disclosure aims to provide a method for determining whether to allow for the SCEF and SCS/AS to multicast/broadcast IoT data for terminals, a method for configuring the terminals to receive the multicast/broadcast IoT data, a method for configuring an MME for multicasting/broadcasting the IoT data, and a method for multicasting/broadcasting the IoT data.

Also, the present disclosure aims to provide a method for allowing a common control network function (CCNF) of a next generation (NG) Core serving a terminal to assign a new CCNF or a new network slice to the terminal in a situation of network congestion/failure or requiring change of a mobility level of the terminal, authentication mechanism, or a user plane function (UPF, e.g., gateway, switch, and router for packet delivery) connected to the CCNF.

Also, the present disclosure aims to provide a method for virtualizing a mobile communication system and configuring a virtual network for a terminal attempting initial attachment to the mobile communication system.

Also, the present disclosure aims to provide a method for assigning a network slice to a roaming terminal attempting to attach to a visited operator's network by connecting the home operator's network in which the terminal is registered to the visited operator's network in a mobile communication system supporting network slicing.

The objects of the present disclosure are not limited to the aforesaid, and other objects not described herein will be clearly understood by those skilled in the art from the descriptions below.

In accordance with an aspect of the present disclosure, a communication method of a common control network function (CCNF) is provided. The communication method includes detecting a CCNF relocation necessity situation, determining a new CCNF, transmitting a CCNF relocation request message including information on a terminal being served by the CCNF to the new CCNF, receiving a CCNF relocation response message from the new CCNF, and performing a location update procedure with the terminal according to a predetermined condition.

Preferably, performing the location update procedure includes transmitting a CCNF relocation notification message including information triggering location update of the terminal and information on the new CCNF.

Preferably, performing the location update procedure includes receiving a location update request message from the terminal and transmitting a location update reject message including information rejecting the location update request and information on the new CCNF.

Preferably, performing the location update procedure includes receiving a location update request message from the terminal and forwarding the location update request message to the new CCNF.

Preferably, detecting the CCNF relocation necessity situation includes determining CCNF relocation necessity based on at least one of whether a CCNF relocation command is received from an operating and management (OAM), whether a number of terminals being served by the CCNF is equal to or greater than a predetermined value, whether CCNF relocation is necessary based on location of the terminal, or whether CCNF relocation is necessary according to change of a mobility level of the terminal.

In accordance with another aspect of the present disclosure, a communication method of a terminal is provided. The communication method includes receiving a common control network function (CCNF) relocation notification message including information triggering a terminal location update procedure and information on a second CCNF from a first CCNF in a situation requiring CCNF relocation and transmitting a location update request message to the second CCNF.

Preferably, the communication method further includes transmitting a location update request message to the first CCNF before receiving the CCNF relocation notification message; transmitting, when a location update reject message including information on the second CCNF is received from the first CCNF, the location update request message to the second CCNF.

Preferably, the communication method further includes transmitting a location update request message to the first CCNF before receiving the CCNF relocation notification message; and receiving, when the location update reject message is not received from the first CCNF, a location update response message transmitted in response to the location update request message which the first CCNF forwards to the second CCNF.

In accordance with another aspect of the present disclosure, a common control network function (CCNF) is provided. The CCNF includes a transceiver configured to transmit and receive signals and a controller coupled with the transceiver and configured to detect a CCNF relocation necessity situation, determine a new CCNF, transmit a CCNF relocation request message including information on a terminal being served by the CCNF to the new CCNF and receive a CCNF relocation response message from the new CCNF, and perform a location update procedure with the terminal according to a predetermined condition.

In accordance with still another aspect of the present disclosure, a terminal is provided. The terminal includes a transceiver configured to transmits and receives signals and a controller coupled with the transceiver and configured to receive a common control network function (CCNF) relocation notification message including information triggering a terminal location update procedure and information on a second CCNF from a first CCNF in a situation requiring CCNF relocation, and transmit a location update request message to the second CCNF.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 is a diagram illustrating network slice management tables for explaining slice information update according to an embodiment of the present disclosure;

DETAILED DESCRIPTION

Figure 1:
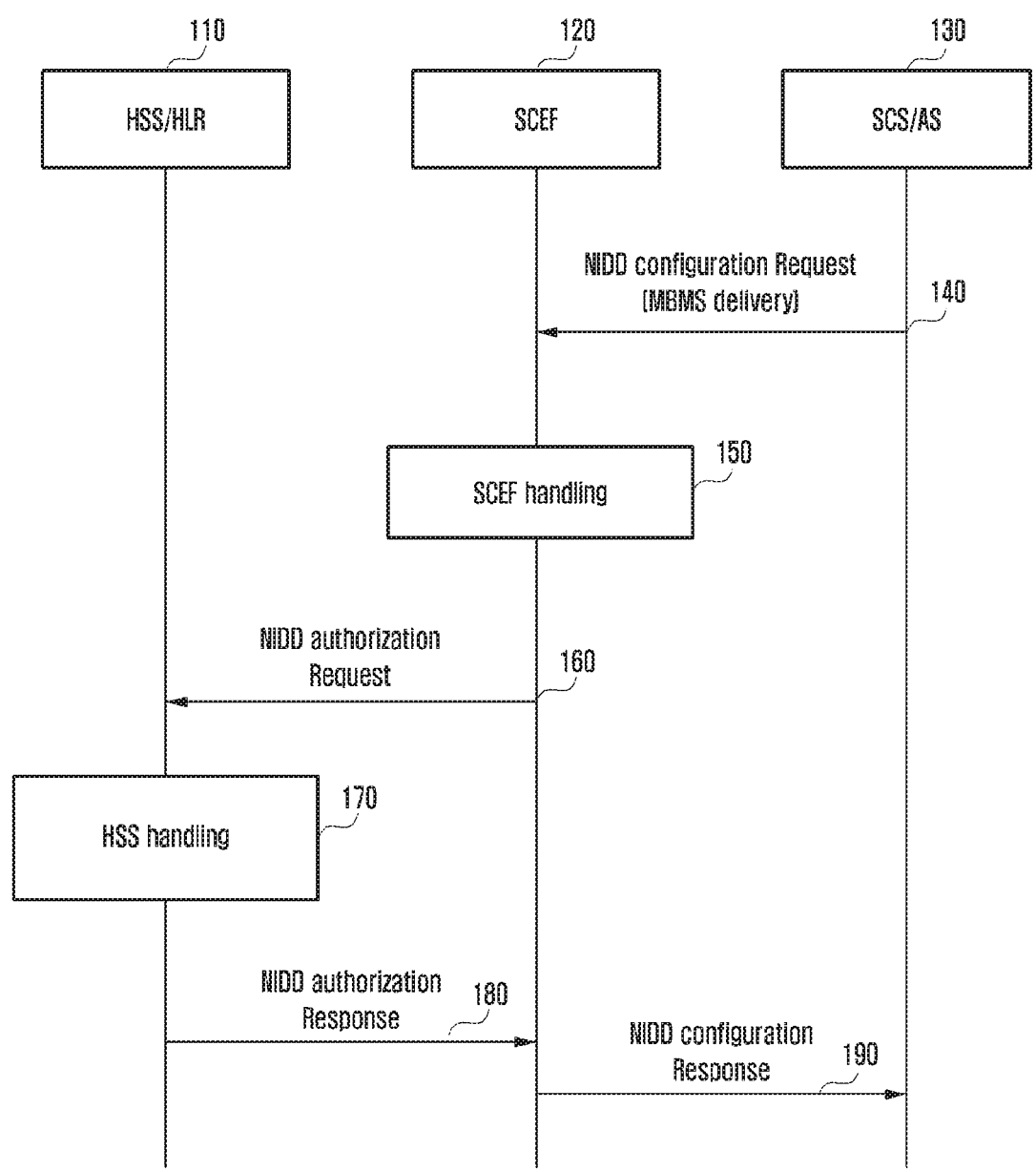
FIG. 1 is a signal flow diagram illustrating a non-IP data delivery (NIDD) configuration procedure for group delivery authorization according to an embodiment of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It will be understood that when an element is referred to as being "connected to" or "coupled to" another element or layer, it can be directly connected or coupled to the other element or intervening elements may be present. It will be understood that the terms "comprises" "comprising," "includes" and/or "including" when used herein, specify the presence of stated features, integers, steps, operations, elements, and/or components, but they do not preclude the presence or addition of one or more other features, steps, operations, elements, components, and/or groups thereof.

Although the components are depicted separately to indicate distinctive features, this does not mean that the components are configured as individual hardware or software units. That is, the components are enumerated separately just for convenience of explanation, and at least two of the components can be implemented as a single component or one component can be divided into a plurality of components taking charge of corresponding functions. The embodiments of the integrated and divided components are included in the scope of the present disclosure without departing from the spirit of the present disclosure Part of the components may not be essential components for necessary functions of the disclosure, and they may be optional components just for performance enhancement. Embodiments of the present disclosure can be implemented with only the essential components required for implementing the subject matter of the present disclosure with the exception of the optional components for performance enhancement, and such a configuration with only the essential components with the exception of the optional components can be included in the claims of the present disclosure.

Detailed descriptions of well-known functions and structures incorporated herein may be omitted to avoid obscuring the subject matter of the present disclosure. Exemplary embodiments of the present disclosure are described in detail with reference to the accompanying drawings. Further, the following terms are defined in consideration of the functionality in the present disclosure, and they may vary according to the intention of a user or an operator, usage, etc. Therefore, the definition should be made on the basis of the overall content of the present specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus to produce a machine, such that the instructions are executed via the processor of the computer or other programmable data processing apparatus to create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Although the description is mainly directed to the New RAN (NR) and NG Core specified in the 5G network standard of the 3rd generation partnership project (3GPP), it will be understood by those skilled in the art that the present disclosure can be applied even to other communication systems having a similar technical background and channel format, with a slight modification, without departing from the spirit and scope of the present disclosure.

In the following description, the terms and definitions given in the 3GPP LTE standard are used. However, the present disclosure is not limited by the terms and definitions, and it can be applied to other standard communication systems.

<Embodiment 1>

Although the description is mainly directed to Long-Term Evolution (LTE) and Evolved Packet Core (EPC) for Radio Access Network (RAN) and Core Network (CN) that are standardized by the 3rd Generation Partnership Project (3GPP), it will be understood by those skilled in the art that the present disclosure can be applied even to other communication/computing systems having a similar technical background and channel format, with a slight modification, without departing from the spirit and scope of the present disclosure.

In the following description, the terms and definitions given in the 3GPP LTE standard are used. However, the present disclosure is not limited by the terms and definitions, and it can be applied to other standard communication systems.

In the following description, the terms "LTE terminal" and "IoT terminal" are intended to mean a mobile terminal capable of radio communication such as a personal digital assistant (PDA), a smartphone, a mobile phone, a tablet computer, and a laptop computer; a measurement device for metering water, electricity, and temperature; an alert device for sensing and reporting a situation such as fire and earthquake; and an electric appliance equipped with a communication function such as an air conditioner, a refrigerator, an air cleaner, a boiler, and a cleaner. In addition to the aforementioned devices, all types of things equipped with communication functions are referred to as IoT terminals. Among the IoT terminals, a terminal that uses a cellular network is referred to as CIoT terminal. In the present disclosure, the device, function, and operation for the CIoT service include the device, function, and operation for small data transmission in an LTE network. The IoT data is intended to mean the data transmitted by an IoT UE or small size data transmitted by a certain type of terminal.

In the present disclosure, the term "non-IP data" is intended to mean data which is not structured in the format of an Internet protocol (IP) packet. The non-IP data is used for small data transmission and suitable for data transmission of IoT devices. A non-IP data format is advantageous in terms of overcoming the inefficiency of using an IP packet for transmitting data smaller than the IP header, which is configured to contain a large amount of information.

The present disclosure assumes the existence of a term-MME link, an MME-SCEF link, and an SCEF-SCS/AS link; the data transmitted by the terminal may reach the SCS/AS, and the data transmitted by the SCS/AS may reach the terminal. It is necessary to perform procedures for establishing the terminal-MME link, MME-SCEF link, and SCEF-SCS/AS link. The SCEF may connect to an HSS to authenticate the terminal for service access.

(Embodiment 1-1)

FIG. 1 is a signal flow diagram illustrating a non-IP data delivery (NIDD) configuration procedure for group delivery authorization according to an embodiment of the present disclosure.

In reference to FIG. 1, an SCS/AS 130 may request to a SCEF 120 for non-IP data delivery configuration. According to an embodiment of the present disclosure, the SCS/AS 130 determines whether a terminal has the authorization for use of a multimedia broadcast/multicast service (MBMS) in a non-IP data delivery (NIDD) configuration procedure.

At step 140, the SCS/AS 130 can transmit an NIDD configuration request message to the SCEF 120. The NIDD configuration request message can include a terminal identifier (ID) (e.g., external ID—not defined in the 3GPP standard but allocated by an application server (application service), an SCS/AS ID, an SCS/AS reference ID for identifying a connection between the SCS/AS and SCEF, an NIDD destination address (e.g., address or identifier of the SCS/AS), and an MBMS delivery request according to an embodiment of the present disclosure. The MBMS delivery request can include an identifier of the SCS/AS for the MBMS delivery. This identifier is identified by a home subscriber server (HSS) 110 and used by the HSS to determine which SCS/AS requests the MBMS delivery.

If the NIDD configuration request message is received, the SCEF 120 can store, at step 150, the terminal ID, SCS/AS ID, SCS/AS reference ID, and NIDD destination address included in the NIDD configuration request message. The SCEF 120 also can determine whether the SCS/AS 130 has a capability of transmitting an MBMS delivery request based on the policy of the mobile communication operator or a service level agreement. If it is determined that the SCS/AS 130 does not have the capability of transmitting an MBMS delivery request, the SCEF 120 can reject the MBMS delivery request. If it is determined to reject the MBMS delivery request, the procedure can jump to step 190 at which the SCEF 120 transmits an NIDD configuration response including the cause of rejection to the SCS/AS 130. If it is determined to accept the MBMS delivery request or if an MBMS delivery authorization procedure is not performed, the procedure can go to step 160.

At step 160, the SCEF 120 can transmit an NIDD authorization message to the HSS 110. The NIDD authorization message can include an ID for use by the terminal in the above process, an access point name (APN) for identifying the SCEF 120, and an MBMS delivery request as proposed in an embodiment of the present disclosure.

At step 170, the HSS 110 can check the NIDD authorization request message to map the terminal ID included in the NIDD authorization request message to an international mobile subscriber identity (IMSI), and can inspect the MBMS delivery request to authorize whether the SCS/AS 130 has an MBMS delivery capability. If it is determined the SCS/AS has no MBMS delivery capability, the HSS 110 can send an MBMS delivery authorization failure cause to the SCEF 120 at step 180, and the SCEF 120 can forward the MBMS delivery authorization failure cause to the SCS/AS 130.

If it is determined that the NIDD authorization request received at step 160 is accepted, the HSS 110 can transmit the NIDD authorization response message to the SCEF 120 at step 180. The NIDD authorization response message can include an IMSI, a terminal ID, and a result of the authorization request. The result of the authorization request can include a result of the NIDD authorization request and a result of the MBMS delivery request.

At step 190, the SCEF 120 can transmit an NIDD configuration response to the SCS/AS 130. The NIDD configuration response message can include an SCS/AS reference ID for identifying a connection between the SCS/AS 130 and the SCEF 120 and a cause. The cause may be associated with the NIDD request and/or the MBMS delivery. The causes associated with the respective NIDD request and MBMS delivery can delivered in the form of two separate values or a single value.

(Embodiment 1-2)

Figure 2:
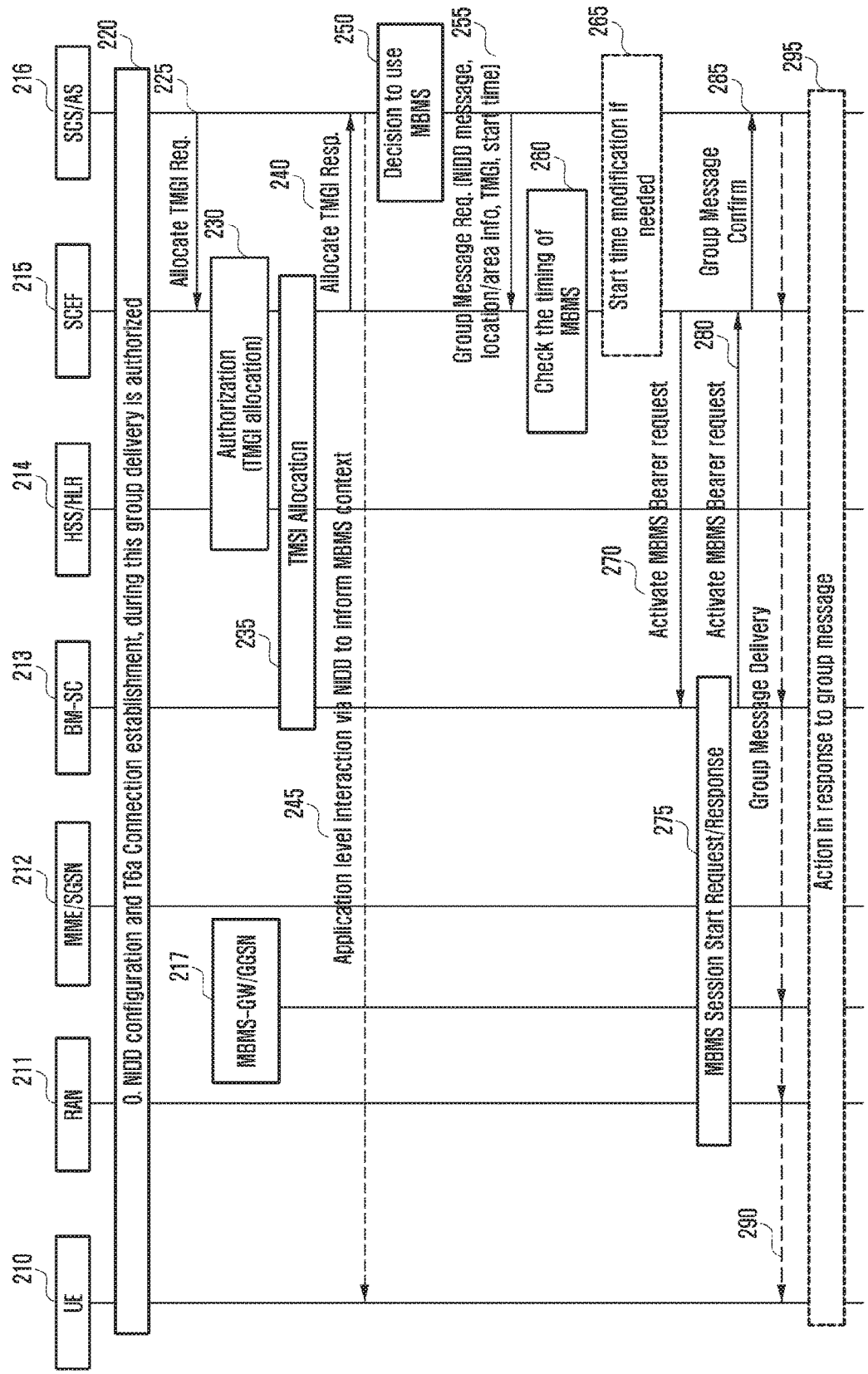
FIG. 2 is a signal flow diagram illustrating a data transmission procedure based on a determination on whether to multicast/broadcast non-IP data to a terminal according to an embodiment of the present disclosure.

FIG. 2 is a signal flow diagram illustrating a data transmission procedure based on a determination on whether to multicast/broadcast non-IP data to a terminal according to an embodiment of the present disclosure.

In reference to FIG. 2, an SCEF 215 and an SCS/AS 216 can perform, at step 220, the operations of their equivalents in the embodiment 1-1 of the present disclosure as described with reference to FIG. 1. The SCEF 215 and an MME 212 can perform a T6a connection establishment procedure to establish a packet data network (PDN) connection between a terminal 210 and the MME 212 and between the MME 212 and the SCEF 215.

At step 225, the SCS/AS 216 can transmit to the SCEF 216 a temporary mobile group identity (TMGI) allocation request (Allocate TMGI Request) message. The TMGI is an identifier for identifying whether MBMS traffic received by the terminal 210 is for the terminal 210 to listen. The Allocate TMGI Request message can include a list of IDs of the terminal 210 (e.g., list of external IDs) or a group ID of the terminal 210, an ID of the SCS/AS 216, and location/area information. The location/area information can indicate the area where the terminal 210 is located and be equivalent to a tracking area ID or cell ID as a terminal location management unit or GPS information of the terminal for use in a legacy LTE system.

At step 230, the SCEF 215 can determine whether the SCS/AS is authorized for TMGI allocation. This determination may be made based on the policy of the mobile communication operator or a service level agreement made with the SCS/AS 215. If the SCS/AS 216 has made the TMGI allocation request with the list of external IDs at step 225, the SCEF 215 can allocate an external group ID. Afterward, the SCEF 215 can map the external group ID to the allocated TMGI and transmit the mapping information to the SCS/AS 216.

At step 235, the SCEF 215 may perform TMGI allocation in cooperation with a broadcast multicast service center (MB-SC). In an embodiment of the present disclosure, the TMGI allocation procedure given in the 3GPP TS 23.468 is used.

At step 240, the SCEF 215 can transmit to the SCS/AS 216 an Allocate TMGI Response message including the TMGI received at step 235 and a TMGI expiry time. If the SCEF 215 allocates a new external group ID at step 230, the Allocate TMGI response message can include the external group ID in the Allocate TMGI Response message being transmitted at step 240. The external ID can be configured to be used temporarily and thus invalidated after the elapse of the TMGI expiry time.

At step 245, the terminal 210 can receive the information on the MBMS that it wants to receive from the SCS/AS 216 through application level interaction. The MBMS information can be transmitted through the NIDD and, in this case, the MBMS information can be delivered to the terminal 210 via the SCEF 215 and the MME 212. The MBMS information can include the TMGI and MBMS traffic transmission start time. The SCS/AS 216 can plan the MBMS traffic transmission timing in advance and designate a specific time (e.g., after designated minutes, after designated hours, after designated days, after designated months, and on a designated date). The terminal 210 can be configured to wake up for receiving MBMS traffic. In the tracking area update (TAU) procedure, the terminal 210 can set a TAU timer to a value such that the terminal 210 is in a reachable state at the time when the MBMS traffic transmission starts. It may also be possible for the terminal to set an extended discontinuous reception (eDRX) parameter to a value such that the terminal 210 is in the reachable state at the time when the MBMS traffic transmission starts.

At step 250, the SCS/AS 216 can determine whether to transmit the non-IP data through MBMS. Such a determination may be made as follows. First, the SCS/AS 216 determines whether a number of terminals located and supposed to receive the same data in an area (tracking area, cell, or GP-based area) in which the MBMS is provided is equal to or greater than a predetermined value. Second, the SCS/AS 216 can determine whether a number of terminals that are predicted to reach the corresponding area in the MBMS traffic transmission time is equal to or greater than a predetermined value. The terminal 210 may not be reachable during a predetermined time period in the mobile communication network because of being in a power saving mode (PSM) or eDRX operation mode. The SCS/AS 216 can count a number of the terminals predicted to be reachable in the MBMS traffic transmission time by means of a monitoring event function of the terminal 210, which is capable of checking the PSM or eDRX status. The predetermined value mentioned in the first second conditions can be a value determined by the mobile communication operator or SCS/AS operator for transmitting MBMS traffic efficiently in view of service management. For example, in order for the terminal 210 to be in a reachable state at 0 AM to receive MBMS data, it may be possible to set the periodic TAU timer to a value such that the terminal 210 wakes up at 0 AM on the last day of the corresponding month or after a predetermined time period has elapsed. The SCS/AS 216 can transmit a signal to the terminal 210 through application level interaction such that the terminal 210 requests to the MME 212 for such configuration. It may also be possible that the SCS/AS 216 sends communication pattern information of the terminal 216 to the MME 212 via the SCEF 215 to configure the terminal 210 to be reachable in the corresponding time. Alternatively, the SCS/AS 216 can determine that all terminals for receiving the MBMS traffic are reachable in 20 minutes after 2 hours as a result of consideration on the PSM time and eDRX value of the terminal 210. In this case, the SCS/AS 216 may set the MBMS traffic transmission start time to 2 hours later to transmit the same MBMS traffic repeatedly for 20 minutes thereafter. After determining to transmit the same traffic, the SCS/AS 216 may perform this operation at step 290.

At step 255, the SCS/AS 216 can transmit a group message request message to the SCEF 215. The group message request message can include an external group identifier, an SCS/AS ID, location/area information, a radio access technology type indicator indicating LTE or 3G, a TMGI, and an MBMS traffic transmission start time. The location/area information can be a tracking area ID for identifying a tracking area as a terminal location management unit or a cell ID, GPS information, or geographical area information. The group message request message can include non-IP data intended to be transmitted by the SCS/AS 216. If the group message request message includes the non-IP data, the SCEF 215 may store the non-IP data until step 290 is performed.

At step 260, the SCEF 215 can determine whether the SCS/AS 216 has the authorization to transmit a group message request message. If the SCS/AS 216 has no authorization to transmit a group message request message, the SCEF 215 can transmit a failure message including a failure cause at step 290. If the SCS/AS 216 has the authorization to transmit a group message quest message, the SCEF 215 can check the MBMS traffic transmission start timing. For example, the SCEF 215 can check the times when the terminals identified by the external group identifier wake up from the power saving mode or eDRX mode so as to be reachable and the time when all of the terminals identified by the external group ID become reachable. The SCEF 215 can provide the MME 212 with the information on the communication pattern of the terminal 210, and the MME 212 sets the periodic TAU timer or eDRX value of the terminal 310 to an appropriate value based on the communication pattern information such that the terminals become reachable at a predetermined time. For example, in order for the terminal 210 to be in a reachable state at 0 AM to receive MBMS data, it may be possible to set the periodic TAU timer to a value such that the terminal 210 wakes up at 0 AM on the last day of the corresponding month or after a predetermined time period has elapsed. Alternatively, the SCS/AS 216 can determine that all terminals for receiving the MBMS traffic are reachable in 20 minutes after 2 hours as a result of consideration on the PSM time and eDRX value of the terminal 210. In this case, the SCS/AS 216 can set the MBMS traffic transmission start time to 2 hours later such that it is determined to transmit the same MBMS traffic repeatedly for 20 minutes thereafter. After determining to transmit the same traffic, the SCS/AS 216 may perform this operation at step 290.

If it is determined that the MBMS traffic transmission start time should be changed in the above operation, the SCEF 215 can notify the SCS/AS 216 of MBMS traffic transmission start time modification and the SCS/AS 216 can confirm the MBMS traffic transmission start time modification at step 265.

At step 270, the SCEF 215 can transmit an Activate MBMS Bearer Request message to the BM-SC 213. The Activate MBMS Bearer Request message can include MBMS broadcast area information, a TMGI, and an MBMS traffic transmission start time. The MBMS broadcast area denotes an MBMS area derived based on the location/area information received from the SCS/AS 216. The MBMS broadcast area can be selected based on the settings per the mobile communication operator, and the SCEF 215 can analogize the MBMS area from the tracking area or cell ID list mapped to a specific area determined based on GPS information.

At step 275, the BM-SC 213 can perform a session start procedure with an MBMS gateway (MBMS-GW) 217 according to the Activate MBMS Bearer Request message received at step 270. The session start procedure can be performed in the same way as the MBMS session start procedure given in the 3GPP TS 23.246.

At step 280, the BM-SC 213 can transmit an Activate MBMS Bearer Response message to the SCEF 215.

At step 285, the SCEF 215 can transmit to the SCS/AS 216 a Group Message Confirm message for confirming the group message request. The Group Message Confirm message can include an IP address and port number for use by the SCS/AS 216 in transmitting data to the SCEF 215.

At step 290, the SCEF 215 can start MBMS traffic transmission in such a way of forwarding the non-IP data received at step 255 to the BM-SC 213 at or after the requested MBMS traffic transmission start time. It can also be possible for the SCS/AS 216 to transmit the non-IP data intended to be transmitted through MBMS to the SCEF 215 using the IP address and port number received at step 285. Upon receipt of the non-IP data, the SCEF 215 forwards the non-IP data to the BM-SC 213 to start MBMS traffic transmission.

At step 295, the terminal 210 can take an action with the SCS/AS 216 in response to the receipt of the MBMS traffic.

Figure 3:
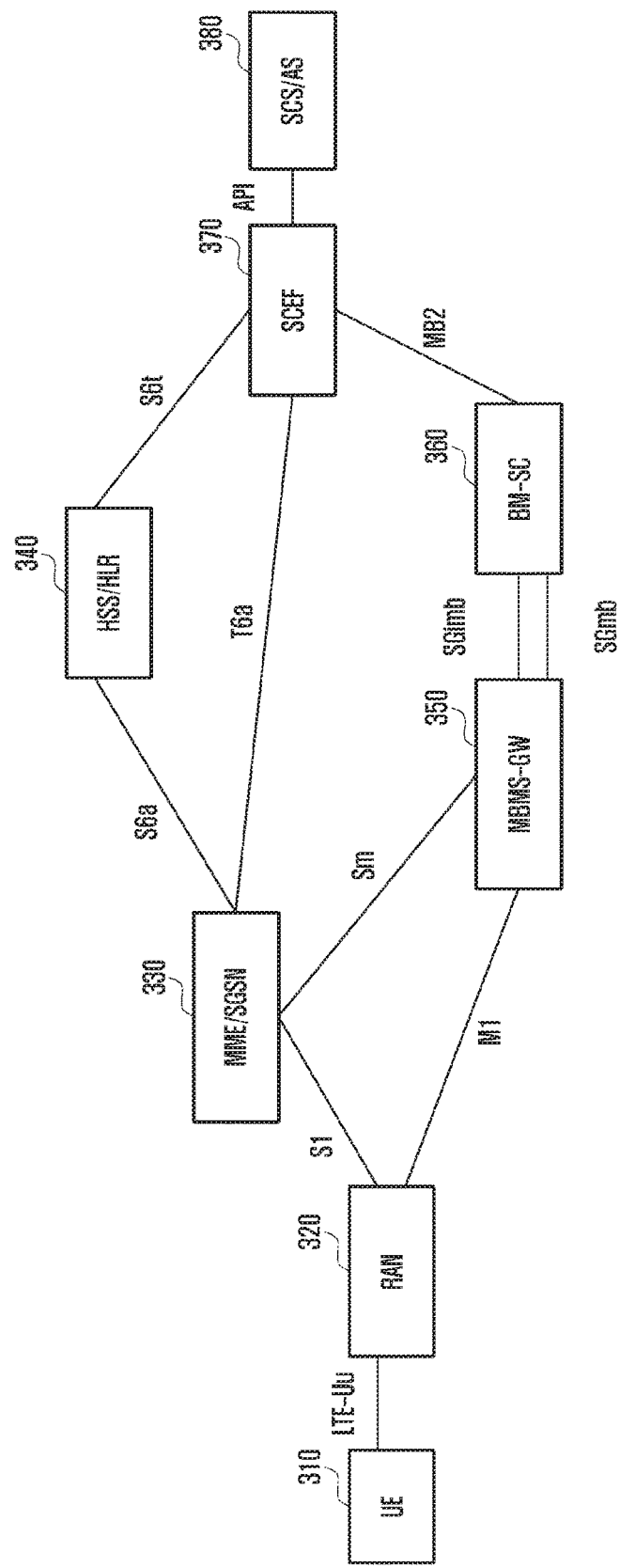
FIG. 3 is a diagram illustrating a network architecture according to an embodiment of the present disclosure.

FIG. 3 is a diagram illustrating a network architecture according to an embodiment of the present disclosure.

In reference to FIG. 3, a terminal 310 can connect to an RAN (base station, or gNB) 320 via an LTE-U interface. The RAN 320 can connect to a mobility management entity/serving GPRS support node (MME/SGSN) 330 via an S1 interface. The RAN 320 can also connect to an MBMS-GW 350 via an M1 interface, and the MME/SGSN 330 can connect to the MBMS-GW 350 via an Sm interface.

The MME/SGSN 330 can connect to an HSS/HLR 340 via an S6a interface, and the HSS/HLR 340 can connect to an SCEF 370 via an S6t interface. The MME/SGSN 330 can also connect to the SCEF 370 via a T6a interface. The MBMS-GW 350 can connect to a BM-SC 360 via SGimb and SGmb interfaces, and the BM-SC 360 can connect to the SCEF 370 via an MB2 interface.

The SCEF 370 also can connect to an SCS/AS 380 via an application programming interface (API).

<Embodiment 2 >
Embodiment (2-1)

Figure 4:
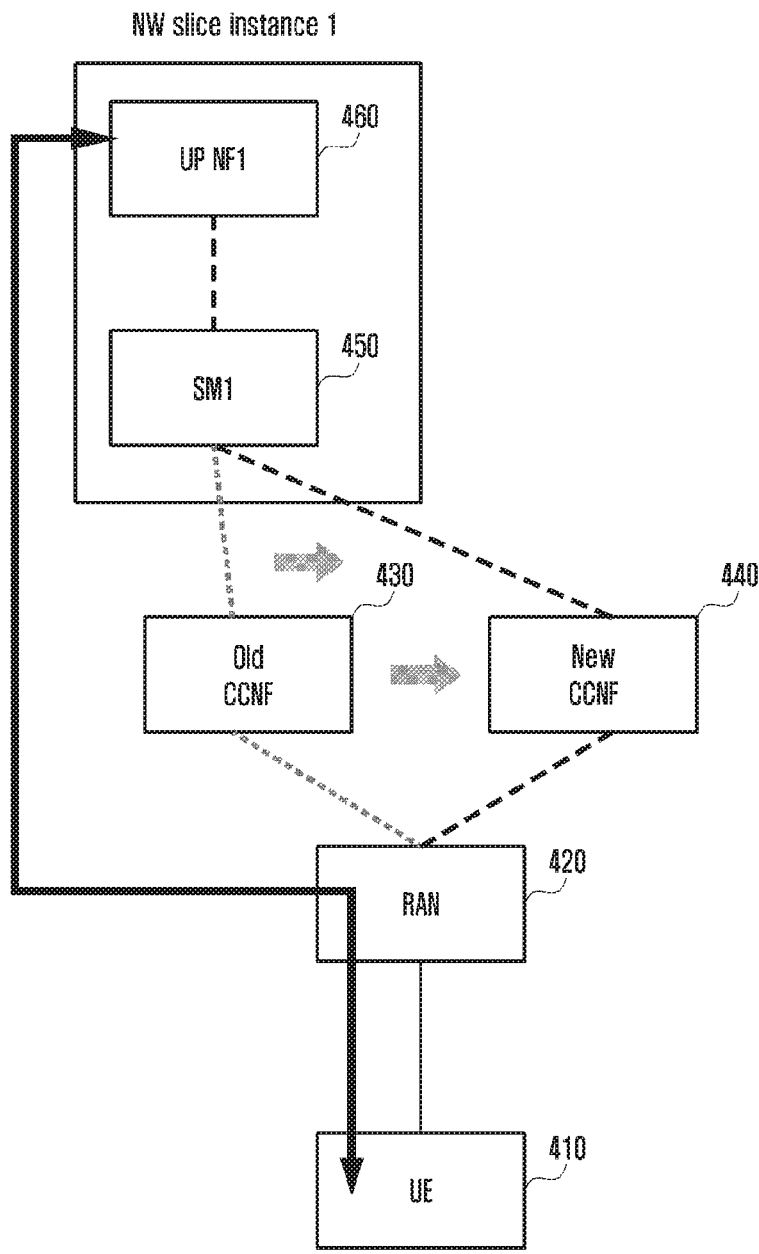
FIG. 4 is a diagram illustrating a CCNF relocation serving same network slice according to an embodiment of the present disclosure.
Figure 5:
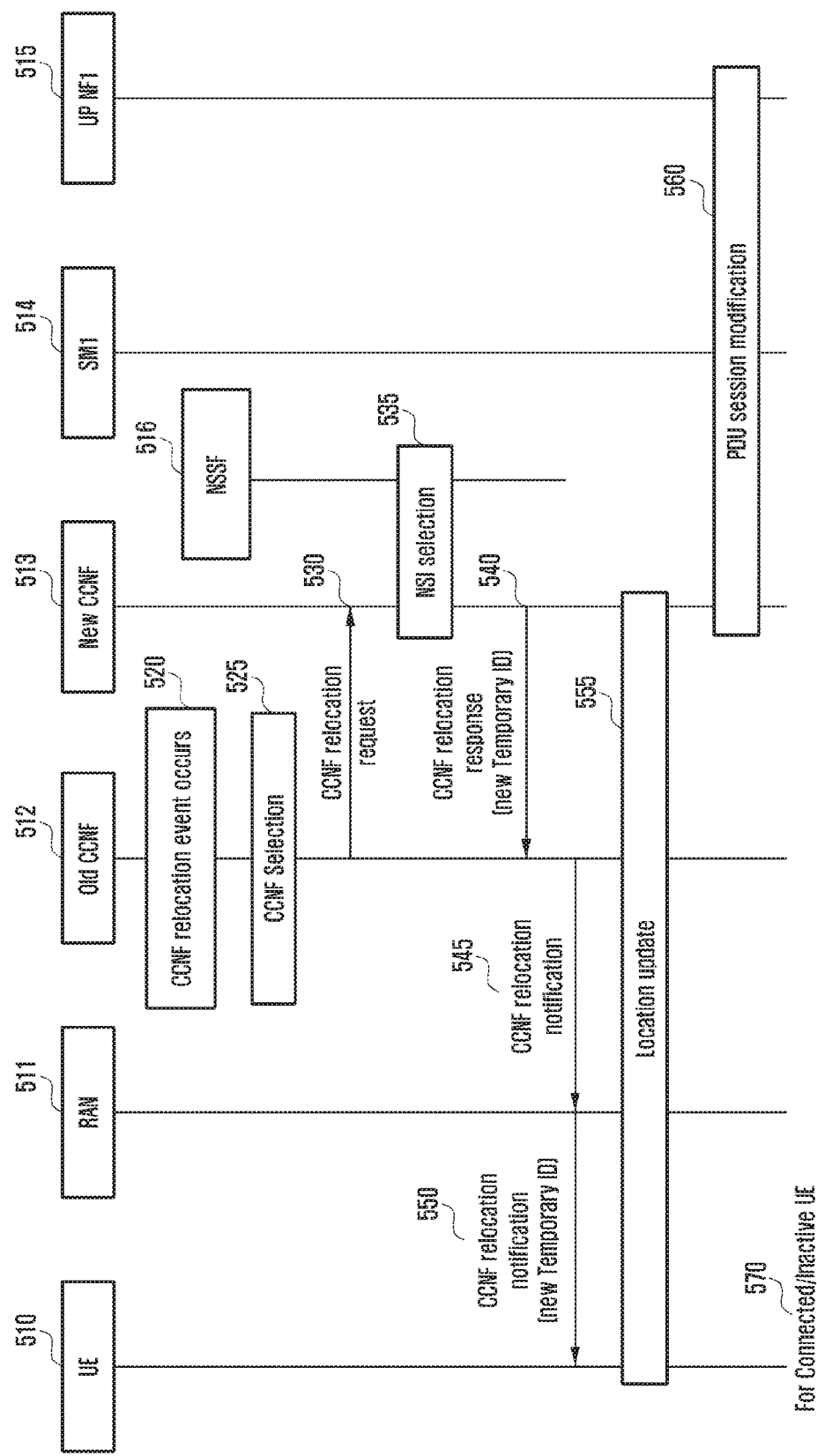
FIG. 5 is a signal flow diagram illustrating method 1 for the CCNF relocation in same network slice according to an embodiment of the present disclosure.
Figure 6:
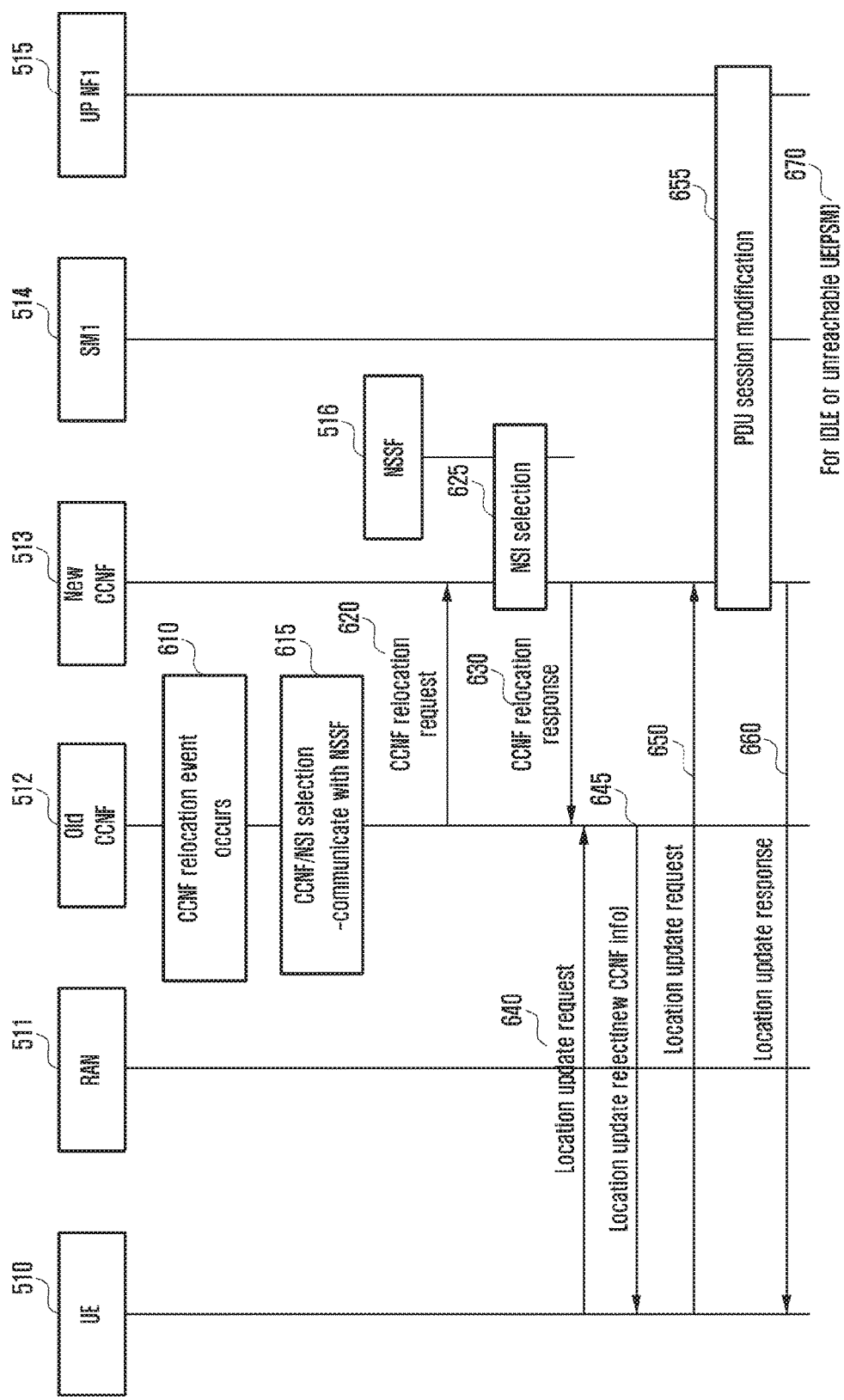
FIG. 6 is a signal flow diagram illustrating method 2 for the CCNF relocation in same network slice according to an embodiment of the present disclosure.
Figure 7:
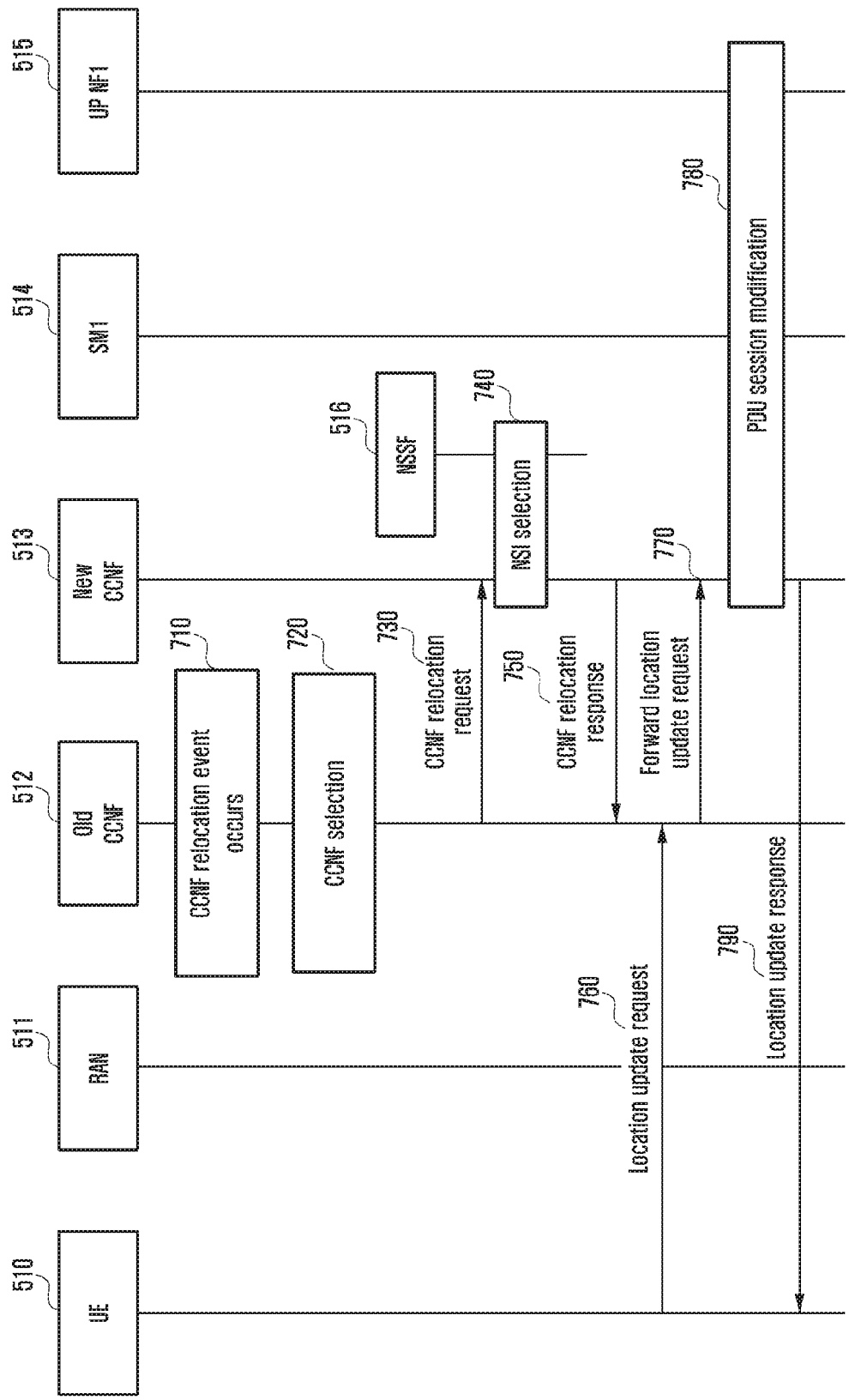
FIG. 7 is a signal flow diagram illustrating method 3 for the CCNF relocation in same network slice according to an embodiment of the present disclosure.

Embodiment 2-1 is described with reference to FIGS. 4 to 7. FIG. 4 is a diagram illustrating a configuration of a network according to an embodiment of the present disclosure, and FIGS. 5 to 7 are signal flow diagrams illustrating signal flows among network entities in the network of FIG. 4.

First, descriptions are made of the entities involved in the present disclosure.

A terminal (user equipment (UE)) can connect to a common control network function (CCNF) (or an access and mobility management function (AMF)) as a 5G core network entity via a radio access network (RAN). The CCNF takes charge of mobility management, UE authentication, and routing session-related messages to a session management (SM) entity. The CCNF connects to the SM, and the SM connects to a user plane network function (UPNF) and allocates resources to the UE for establishing a tunnel between an RAN and the UPNF for data forwarding.

The term "network slice instance" denotes a service provided by a network comprised of a CCNF, an SM, and an UPNF. For example, if a mobile communication operator intends to provide a broadband communication service, a network service is defined fulfilling the constraints for broadband communication service, and the network slice instance is configured according to the network service to provide the corresponding service. If the mobile communication operator intends to provide an IoT service, a network service is defined fulfilling the constraints for the IoT, and the network slice instance is configured for the IoT to provide the corresponding service.

FIG. 4 is a diagram illustrating a CCNF relocation serving same network slice according to an embodiment of the present disclosure.

FIG. 4 depicts a situation as follows.

A UE 410 is receiving a 5G network service hosted by a (old) CCNF 430, which is serving the UE 410 as part of the network slice instance 1 in the state of being connected to the UPNF1 460 via the SM1 450.

At a certain time, it may occur that the (old) CCNF 430 serves too many UEs and thus encounters an overload situation or a congestion situation. In this case, the (old) CCNF 430 may offload the UE 410 to a new CCNF 440 as a means of congestion control for service continuity.

It may also be possible to exemplify a situation where the UE 410 moves from one area covered by the old CCNF 430 to another area covered by the new CCNF 440. In this case, it may be necessary to relocate the UE context and connectivity from the old CCNF 430 to the new CCNF 440 for service continuity to the UE 410. The CCNFs 430 and 440 may be deployed to cover different areas in an area-specific manner, and the CCNF relocation may take place between neighboring CCNFs to reduce latency of signaling to the UE 410. In the case that the CCNFs 430 and 440 are located in a boundary between two areas, CCNF relocation may take place for the UE 410 connected to the RAN 420.

FIGS. 5 to 7 illustrate a method for performing the CCNF relocation procedure, if a condition for the CCNF relocation occurs, and the CCNF relocation procedure is trigged.

FIG. 5 is a signal flow diagram illustrating method 1 for the CCNF relocation in same network slice according to an embodiment of the present disclosure.

In FIG. 5, a CCNF 512 serving a UE(s) 510 notifies the UE(s) 510 of CCNF relocation during the CCNF relocation procedure such that the UE(s) 510 is registered with a new CCNF 513 through a location update procedure. In this embodiment, the relocation procedure may be performed for a UE in a connected state, an idle state, or in connected but inactive state as denoted by reference number 570. This procedure cannot be performed for a UE that is unreachable and cannot receive a CCNF relocation notification message from the CCNF 512.

A (old) CCNF 512 may detect a CCNF relocation necessity situation at step 520. The (old) CCNF 512 may determine whether CCNF relocation is necessary as follows.

The CCNF 512 may receive a command instructing relocation to another CCNF 513 because the old CCNF 512 is in an overload situation, the command being transmitted by an operating and management entity (OAM) (not shown), i.e., a network management entity. Here, the OAM may notify the old CCNF 512 of the address or name of a new CCNF 513 as a relocation target.

The CCNF 512 can check a number of UEs it serves and, if the number of UEs is equal to or greater than a predetermined threshold, determine that it is in an overload situation or a congestion situation. The maximum number of UEs the CCNF 512 can serve can be preconfigured or received from the OAM.

The CCNF 512 may detect UE mobility and check the current location of the UE 510 for cell ID or location management unit (e.g., tracking area) to determine whether relocation to the neighboring CCNF 513 or a CCNF preconfigured to serve the UE 510 at the corresponding location is necessary.

The mobility level of the UE 510 can be changed. The CCNF 512 can detect the necessity of the mobility level change based on the request from the UE 510 or a UE mobility level change notification transmitted by a subscription server (not shown) of the network or the OAM when the subscription of the UE 510 is changed. The CCNF 512 can determine whether it supports the requested mobility level and, if it cannot support the mobility level, determine the necessity of CCNF relocation. The mobility level denotes a degree of mobility supported by the mobile communication network, and examples of the mobility level include a "no mobility" level at which UE mobility is not supported in the least, a "low mobility (limited mobility)" level at which the UE mobility is supported in limited areas, and a "high mobility (unlimited mobility)" level at which the UE mobility is supported within the entire service coverage area of the mobile communication network.

After detecting the necessity of CCNF relocation at step 520, the old CCNF 512 can discover a new CCNF 513 as the best CCNF relocation target at step 525. As exemplified in the description of step 520, the old CCNF 512 can select the target CCNF based on the CCNF address or name transmitted by the OAM. In the case that the old CCNF 512 has a list of CCNFs taking charge of specific areas, it may select the best CCNF based on the changed location of the UE 510. Also, in the case that the old CCNF 512 has a list of CCNFs supporting the mobility levels which the old CCNF 512 cannot support, the old CCNF 512 can select a new CCNF that supports the changed mobility level or a target mobility level of the UE 510.

After selecting the new CCNF 513 at step 525, the old CCNF 512 can transmit a CCNF relocation request message to the new CCNF 513 at step 530. The CCNF relocation request message can include information on the contexts of the UE(s) 510 served by the old CCNF 512. The UE context can include mobility management context and security key of the UE 510. The CCNF relocation request message can include the information on the network slice to which the old CCNF 512 belongs, and the network slice information can be a network slice instance ID or the type of service that the old CCNF 512 provides through the network slice. The CCNF relocation request message also can include information on the SM1 514 and the UPNF1 515 to which the old CCNF 512 is connected. The CCNF relocation request message also can include information on the mobility level requested to the old CCNF 512. The CCNF relocation request message also can include a mobility level of the UE being served by the old CCNF 512, authentication information, and authentication mechanism. The CCNF relocation request message also can include multi-dimensional-descriptor (MDD) for the UE(s) 510. The MDD is a descriptor about the network slice including the CCNF 512 to which the terminal 510 is connected. The new CCNF 513 can identify or select a network slice instance based on the MDD. The UE contexts can include the contexts of the UEs in the connected state or RRC-inactive state.

At step 535, the new CCNF 513 can negotiate with a network slice selection function (NSSF) 516 to select a network slice instance (NSI). The NSSF 516 can be an independent entity or a function collocated with the CCNF 513. The new CCNF 513 can request to the NSSF 516 for NSI selection based on the information acquired at step 530 to determine an SM and an UPNF to connect.

At step 540, the new CCNF 513 may transmit a CCNF Relocation Response message to the old CCNF 512 in response to the CCNF Relocation Request message received at step 530. The CCNF Relocation Response message can include a new temporary ID to be allocated to the UE(s) 510 that has been managed by the old CCNF 512. The new CCNF 513 allocates the temporary ID to the UE 510, and the RAN 511 and the old CCNF 512 can identify the new CCNF 513 serving the UE 510 based on this ID. The CCNF relocation response message transmitted by the new CCNF 513 can include a result value indicating that the CCNF relocation and NSI selection are successful. The new CCNF 513 can transmit to the old CCNF 512 the information indicating that it serves the UE 510 in the same network slice instance as the old CCNF 512.

If the CCNF Relocation Response message is received at step 540, the old CCNF 512 can transmit to the UE 510 a CCNF Relocation Notification message, at step 545, to instruct triggering location update because the CCNF has changed. The CCNF relocation notification message can be a non-access stratum (NAS) message, and the RAN 511 transparently transmits the CCNF relocation notification message to the terminal 510. If it is determined at step 540 that there is no change of NSI even though CCNF relocation has taken placed to the new CCNF 513, the CCNF Relocation Notification message transmitted from the old CCNF 512 to the RAN 511 can include the previously used session identifier. Then the RAN 511 may notice that the session is maintained.

At step 550, the UE 510 can receive the CCNF Relocation Notification message transmitted by the old CCNF 512. If the CCNF Relocation Notification message includes a new temporary ID, the UE 510 can perform a location update procedure with the new temporary ID at step 555.

At step 555, the UE 510 can perform the location update procedure triggered at step 550 and, if a new temporary ID is received at step 550, the location update procedure is performed with the new temporary ID. Part of the new temporary ID may be included in an RRC message and, in this case, the RAN 51 can identify the new CCNF 513 based on the corresponding information and route a NAS message. If a Location Update Request message transmitted by the UE 510 is received, the new CCNF 513 can perform the remaining part of the location update procedure.

If the session-related information of the UE 510 is modified during the location update procedure, e.g., if an ID of the base station or the session management context requested by the UE 510 is different from the session management context that has been used by the old CCNF 512, the new CCNF 513 can perform a protocol data unit (PDU) session modification procedure with the SM1 514 at step 560. Then, the SM1 514 can modify the PDU session modification with the UPNF1 515 according to the changed context.

FIG. 6 is a signal flow diagram illustrating method 2 for the CCNF relocation in same network slice according to an embodiment of the present disclosure.

In FIG. 6, the CCNF 512 performs a CCNF relocation procedure in such a way of rejecting the location update requested by the UE(s) 510 or triggered in a periodic location update procedure and redirecting to a new CCNF 513. In this embodiment, the relocation procedure can be performed for a UE in the idle state, waked up from the power saving mode, or performing periodic location update procedure as denoted by reference number 670. The embodiment of FIG. 6 differs from the embodiment of FIG. 5 in that the CCNF 512 does not trigger CCNF relocation progressively. Instead, it notifies the necessity of CCNF relocation to the UE(s) 510 intending to connect to the old CCNF 512 or check validity of the connection. This procedure is performed as follows.

The old CCNF 512 can detect a CCNF relocation necessity situation at step 610. The (old) CCNF 512 can determine whether CCNF relocation is necessary as follows.

The CCNF 512 can receive a command instructing relocation to another CCNF 513 because the old CCNF 512 is in an overload situation, the command being transmitted by an operating and management entity (OAM) (not shown), i.e., a network management entity. Here, the OAM may notify the old CCNF 512 of the address or name of a new CCNF 513 as a relocation target.

The CCNF 512 can check a number of UEs it serves and, if the number of UEs is equal to or greater than a predetermined threshold, determine that it is in an overload situation or a congestion situation. The maximum number of UEs the CCNF 512 can serve may be preconfigured or received from the OAM.

The CCNF 512 may detect UE mobility and check the current location of the UE 510 for cell ID or location management unit (e.g., tracking area) to determine whether relocation to the neighboring CCNF 513 or a CCNF preconfigured to serve the UE 510 at the corresponding location is necessary.

The mobility level of the UE 510 can be changed. The CCNF 512 can detect the necessity of the mobility level change based on the request from the UE 510 or a UE mobility level change notification transmitted by a subscription server (not shown) of the network or the OAM when the subscription of the UE 510 is changed. The CCNF 512 can determine whether it supports the requested mobility level and, if it cannot support the mobility level, determine the necessity of CCNF relocation. The mobility level denotes a degree of mobility supported by the mobile communication network, and examples of the mobility level can include a "no mobility" level at which UE mobility is not supported in the least, a "low mobility (limited mobility)" level at which the UE mobility is supported in limited areas, and a "high mobility (unlimited mobility)" level at which the UE mobility is supported within the entire service coverage area of the mobile communication network.

After detecting the necessity of CCNF relocation at step 610, the old CCNF 512 can discover a new CCNF 513 as the best CCNF relocation target at step 615. As exemplified in the description of step 610, the old CCNF 512 can select the target CCNF based on the CCNF address or name transmitted by the OAM. In the case that the old CCNF 512 has a list of CCNFs taking charge of specific areas, it can select the best CCNF based on the changed location of the UE 510. Also, in the case that the old CCNF 512 has a list of CCNFs supporting the mobility levels that the old CCNF 512 cannot support, the old CCNF 512 can select a new CCNF that supports the changed mobility level or a target mobility level of the UE 510.

After selecting the new CCNF 513 at step 615, the old CCNF 512 can transmit a CCNF relocation request message to the new CCNF 513 at step 620. The CCNF relocation request message can include information on the contexts of the UE(s) 510 served by the old CCNF 512. The UE context can include mobility management context and security key of the UE 510. The CCNF relocation request message can include information on the network slice to which the old CCNF 512 belongs, and the network slice information can be a network slice instance ID or the type of service that the old CCNF 512 provides through the network slice. The CCNF relocation request message also can include information on the SM1 514 and the UPNF1 515 to which the old CCNF 512 is connected. The CCNF relocation request message also can include information on the mobility level requested to the old CCNF 512. The CCNF relocation request message also can include a mobility level of the UE being served by the old CCNF 512, authentication information, and authentication mechanism. The CCNF relocation request message also can include multi-dimensional-descriptor (MDD) for the UE(s) 510. The MDD is a descriptor about the network slice including the CCNF 512 to which the terminal 510 is connected. The new CCNF 513 can identify or select a network slice instance based on the MDD.

At step 625, the new CCNF 513 can negotiate with the NSSF 516 to select an NSI. The NSSF 516 can be an independent entity or a function collocated with the CCNF 513. The new CCNF 513 can request to the NSSF 516 for NSI selection based on the information acquired at step 620 to determine an SM and a UPNF to connect.

At step 630, the new CCNF 513 can transmit a CCNF Relocation Response message to the old CCNF 512 in response to the CCNF Relocation Request message received at step 620. The CCNF Relocation Response message can include a new temporary ID to be allocated to the UE(s) 510 that has been managed by the old CCNF 512. The new CCNF 513 allocates the temporary ID to the UE 510, and the RAN 511 and the old CCNF 512 can identify the new CCNF 513 serving the UE 510 based on this ID. The CCNF relocation response message transmitted by the new CCNF 513 can include a result value indicating that the CCNF relocation and NSI selection are successful. The new CCNF 513 can transmit to the old CCNF 512 the information indicating that it serves the UE 510 in the same network slice instance as the old CCNF 512.

At step 640, the UE 510 can perform a periodic location update or a mobility-based location update.

The old CCNF 512 has determined, through steps 610 to 630, to relocate the UE 510 which transmits a location update request message to the new CCNF 513. If a location update request message is received at step 640, the old CCNF 512 can transmit a location update reject message to the UE 510 at step 645. The location update reject message transmitted from the old CCNF 512 to the UE 510 can include routing information for routing to the new CCNF 513.

If the location update reject message including the routing information for routing to the new CCNF 513 is received at step 645, the UE 510 can transmit to the RAN 511 an RRC message conveying the location update request message including the routing information at step 650. The RAN 511 can check the RRC message for the routing information to identify the new CCNF 513 and forward the location update request message to the new CCNF 513. If the location update request message is received, the new CCNF 513 can perform the remaining part of the location update procedure. The new CCNF 513 can perform authentication on or identify the UE 510 that has transmitted the location update request message based on the context received at step 620.

If the location update request message transmitted by the UE 510 includes session management modification information, the new CCNF 513 can request to the SM1 514 for a PDU session modification such that the SM1 514 performs a PDU session modification procedure with the UPNF1 515 at step 655.

At step 660, the new CCNF 513 can transmit a location update response message to the UE 510 in response to the location update request message so as to complete the location update procedure.

FIG. 7 is a signal flow diagram illustrating method 3 for the CCNF relocation in same network slice according to an embodiment of the present disclosure.

In FIG. 7, the CCNF 512 performs a CCNF relocation procedure in such a way of forwarding a location update request transmitted by the UE(s) 510 or generated in a periodic location update procedure. In this embodiment, the relocation procedure can be performed for a UE in the idle state, waked up from the power saving mode, or performing periodic location update procedure. The embodiment of FIG. 7 is similar to the embodiment of FIG. 6, but it is different in that the old CCNF 512 forwards the location update request message received from the UE 510 to the new CCNF 513 rather than rejecting the location update request message.

The old CCNF 512 can detect a CCNF relocation necessity situation at step 710. The (old) CCNF 512 can determine whether CCNF relocation is necessary as follows.

The CCNF 512 can receive a command instructing relocation to another CCNF 513 because the old CCNF 512 is in an overload situation, the command being transmitted by an operating and management entity (OAM) (not shown), i.e., a network management entity. Here, the OAM can notify the old CCNF 512 of the address or name of a new CCNF 513 as a relocation target.

The CCNF 512 may check a number of UEs it serves and, if the number of UEs is equal to or greater than a predetermined threshold, determine that it is in an overload situation or a congestion situation. The maximum number of UEs the CCNF 512 can serve can be preconfigured or received from the OAM.

The CCNF 512 may detect UE mobility and check the current location of the UE 510 for cell ID or location management unit (e.g., tracking area) to determine whether relocation to the neighboring CCNF 513 or a CCNF preconfigured to serve the UE 510 at the corresponding location is necessary.

The mobility level of the UE 510 may be changed. The CCNF 512 can detect the necessity of the mobility level change based on the request from the UE 510 or a UE mobility level change notification transmitted by a subscription server (not shown) of the network or the OAM when the subscription of the UE 510 is changed. The CCNF 512 can determine whether it supports the requested mobility level and, if it cannot support the mobility level, determine the necessity of CCNF relocation. The mobility level denotes a degree of mobility supported by the mobile communication network, and examples of the mobility level include a "no mobility" level at which UE mobility is not supported in the least, a "low mobility (limited mobility)" level at which the UE mobility is supported in limited areas, and a "high mobility (unlimited mobility)" level at which the UE mobility is supported within the entire service coverage area of the mobile communication network.

After detecting the necessity of CCNF relocation at step 710, the old CCNF 512 can discover a new CCNF 513 as the best CCNF relocation target at step 720. As exemplified in the description of step 710, the old CCNF 512 can select the target CCNF based on the CCNF address or name transmitted by the OAM. In the case that the old CCNF 512 has a list of CCNFs taking charge of specific areas, it can select the best CCNF based on the changed location of the UE 510. Also, in the case that the old CCNF 512 has a list of CCNFs supporting the mobility levels that the old CCNF 512 cannot support, the old CCNF 512 can select a new CCNF that supports the changed mobility level or a target mobility level of the UE 510.

After selecting the new CCNF 513 at step 720, the old CCNF 512 can transmit a CCNF Relocation Request message to the new CCNF 513 at step 730. The CCNF Relocation Request message can include information on the contexts of the UE(s) 510 served by the old CCNF 512. The UE context can include mobility management context and security key of the UE 510. The CCNF Relocation Request message can include information on the network slice to which the old CCNF 512 belongs, and the network slice information can be a network slice instance ID or the type of service that the old CCNF 512 provides through the network slice. The CCNF Relocation Request message also can include information on the SM1 514 and the UPNF1 515 to which the old CCNF 512 is connected. The CCNF Relocation Request message can also include information on the mobility level requested to the old CCNF 512. The CCNF Relocation Request message also can include a mobility level of the UE being served by the old CCNF 512, authentication information, and authentication mechanism. The CCNF Relocation Request message also can include multi-dimensional-descriptor (MDD) for the UE(s) 510. The MDD is a descriptor about the network slice including the CCNF 512 to which the terminal 510 is connected. The new CCNF 513 can identify or select a network slice instance based on the MDD.

At step 740, the new CCNF 513 can negotiate with the NSSF 516 to select an NSI. The NSSF 516 can be an independent entity or a function collocated with the CCNF 513. The new CCNF 513 can request to the NSSF 516 for NSI selection based on the information acquired at step 730 to determine an SM and a UPNF to connect.

At step 750, the new CCNF 513 can transmit a CCNF Relocation Response message to the old CCNF 512 in response to the CCNF Relocation Request message received at step 730. The CCNF Relocation Response message can include a new temporary ID to be allocated to the UE(s) 510 that has been managed by the old CCNF 512. The new CCNF 513 allocates the temporary ID to the UE 510, and the RAN 511 and the old CCNF 512 can identify the new CCNF 513 serving the UE 510 based on this ID. The CCNF Relocation Response message transmitted by the new CCNF 513 can include a result value indicating that the CCNF relocation and NSI selection are successful. The new CCNF 513 can transmit to the old CCNF 512 the information indicating that it serves the UE 510 in the same network slice instance as the old CCNF 512.

At step 760, the UE 510 can perform a periodic location update or a mobility-based location update.

It is noted that the old CCNF 512 has exchanged the context of the UE(s) 510 or relocation-related information with the new CCNF 513 through steps 710 to 750. Accordingly, the old CCNF 512 can forward the Location Update Request message received at step 760 from the UE 510 to the new CCNF 513 at step 770.

If the Location Update Request message is received, the new CCNF 513 can perform the remaining part of the location update procedure at step 780. The new CCNF 513 can authenticate or identify the UE 510 that has transmitted the Location Update Request message based on the context received at step 730.

If the Location Update Request message transmitted by the UE 510 includes session management modification information, the new CCNF 513 can request to the SM1 514 for a PDU session modification such that the SM1 514 performs a PDU session modification procedure with the UPNF1 515.

At step 790, the new CCNF 513 can transmit a Location Update Response message to the UE 510 in response to the Location Update Request message so as to complete the location update procedure.

Embodiment (2-2)

Figure 8:
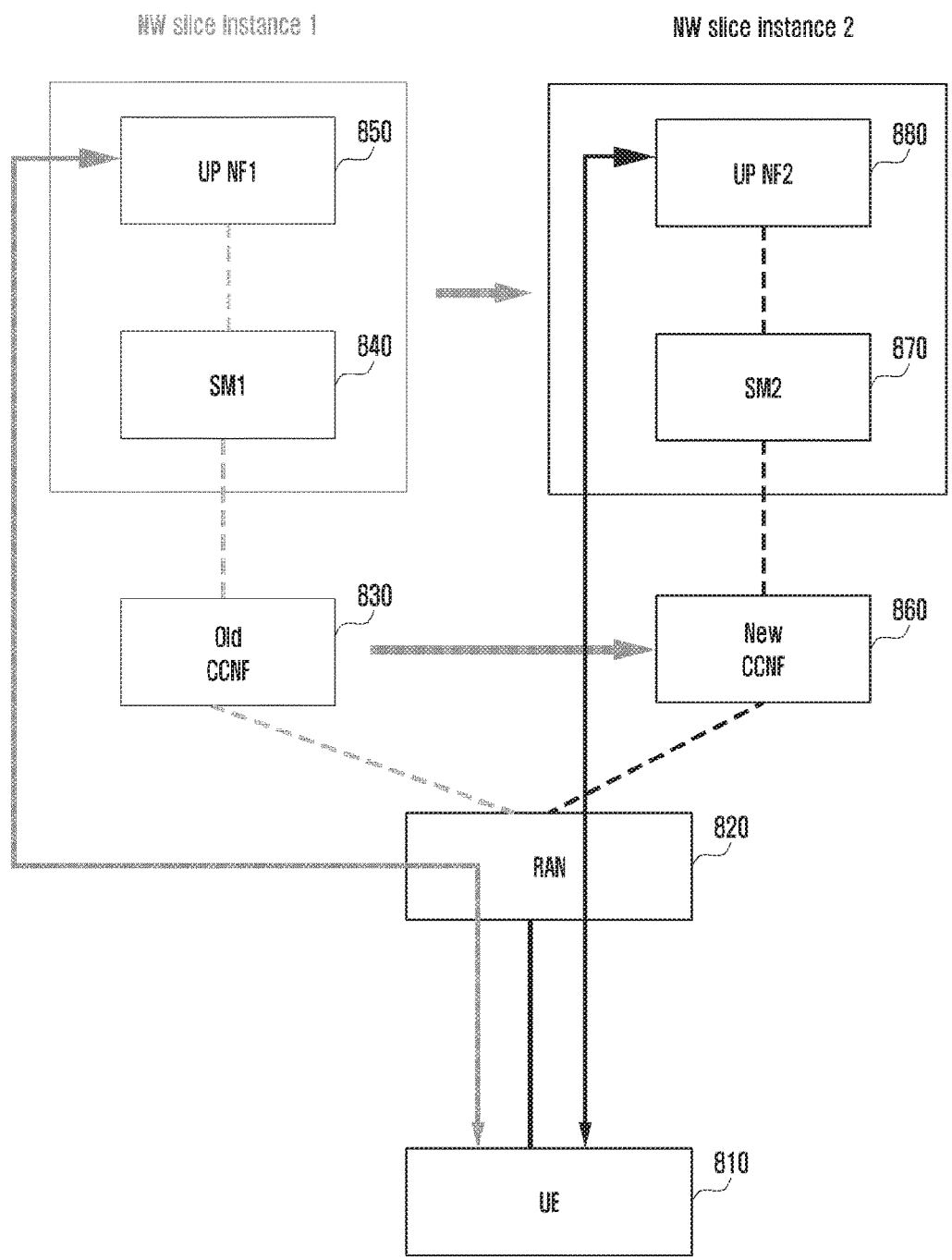
FIG. 8 is a diagram illustrating the CCNF relocation serving different network slices according to an embodiment of the present disclosure.
Figure 9:
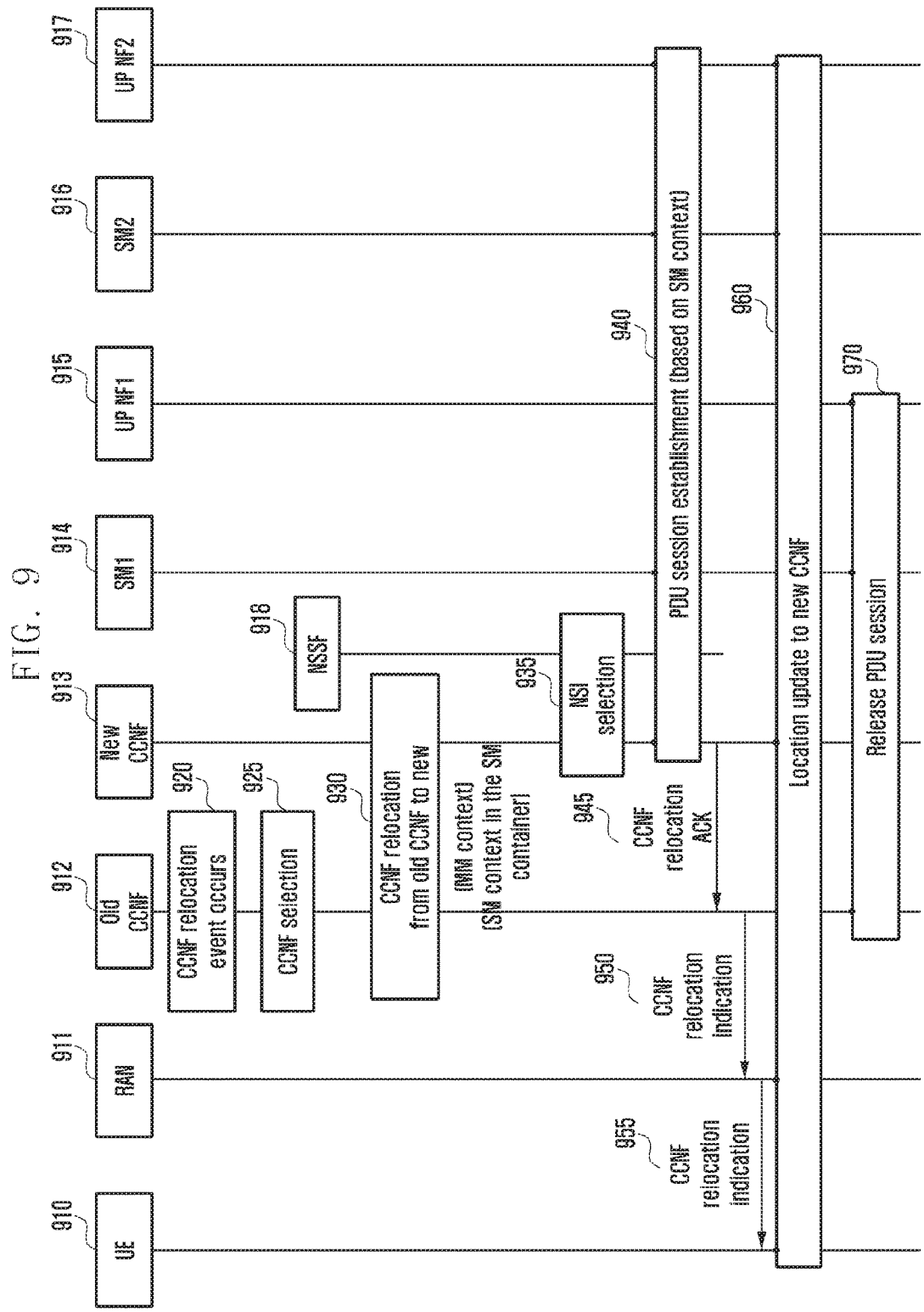
FIG. 9 is a signal flow diagram illustrating a method for the CCNF relocation serving different network slices according to an embodiment of the present disclosure.

Embodiment 2-2 is described with reference to FIGS. 8 and 9. FIG. 8 is a diagram illustrating a configuration of a network according to an embodiment of the present disclosure, and FIG. 9 is a signal flow diagram illustrating signal flows among network entities in the network of FIG. 8.

FIG. 8 is a diagram illustrating the CCNF relocation serving different network slices according to an embodiment of the present disclosure.

FIG. 8 depicts a situation as follows.

A UE 810 is receiving a 5G network service hosted by a (old) CCNF 830, which is serving the UE as part of the network slice instance 1 in the state of being connected to a UPNF1 850 via an SM1 840.

At a certain time, it may occur that the (old) CCNF 830 serves too many UEs and thus encounters an overload situation or a congestion situation. In this case, the (old) CCNF 830 may offload the UE 810 to a new CCNF 860 as a means of congestion control for service continuity.

In another example, if the UE 810 moves from one area to another area, the CCNFs 830, 860 serving the areas may be different. In this case, for providing service to the UE 810 continuously, the CCNF (old CCNF) 830 located in the old area relocates the context of the UE 810 and connectivity to the CCNF (new CCNF) 860 located in the new area to provide the UE 810 service constantly. The CCNFs 830 and 860 may be deployed to cover different areas in an area-specific manner and CCNF relocation may take place between neighboring CCNFs to reduce latency of signaling to the UE 810. In the case that the CCNFs 830 and 860 are located in a boundary between two areas, CCNF relocation may take place for the UE 810 connected to the RAN 820.

FIG. 8 illustrates a detailed situation which the new CCNF 860 supports another network slice instance in the above situation, and the connection is changed to a network slice instance different from the network slice instance supported by the old CCNF 830. As the CCNF is changed, the network slice instance is also changed, and information about the PDU session connection to be provided to the UE 810 should be set up in the new network slice instance.

FIG. 9 is a signal flow diagram illustrating a method for the CCNF relocation serving different network slices according to an embodiment of the present disclosure.

In FIG. 9, a CCNF relocation procedure is triggered by a CCNF relocation event, the CCNF relocation procedure being performed in such a way of changing the network slice instance along with the change of SM and UPNF. Steps 920 to 935 of FIG. 9 are almost identical to steps 520 to 535 of FIG. 5, steps 610 to 625 of FIG. 6, and steps 710 to 740 of FIG. 7.

If the new CCNF 913 notices, at step 935, that the NSI will be changed, the new CCNF 913 can request to an SM2 916 for PDU session establishment at step 940 based on the session management context of the UE 910 in the connected state or the RRC inactive state, the session management context being received at step 930. The SM2 916 can negotiate with an UPNF2 917 belonging to the same NSI to establish a PDU session. If the UE 910 is in the idle state, the PDU session may not be established.

Through steps 945 to 955, the CCNF relocation is notified to the UE 910 in order for the UE 910 to trigger a location update request as described in the embodiments of FIGS. 5 to 7. Steps 945 to 955 can be performed for the UE in the connected state or the RRC inactive state. Steps 945 to 955 are skipped for the UE operating as described with reference to FIGS. 6 and 7, and the procedure can jump to step 960.

A location update procedure can be performed at step 960 in a similar way to those procedures described in the embodiments of FIGS. 5 to 7. Since the CCNF serving the UE 910 and the NSI being hosted by the CCNF for serving the UE 910 are changed, this change can be reflected in establishing a connection between the UE 910 and the UPNF2 917 via the RAN 911, the new CCNF 913, the SM2 916, and the SM2 916 during the location update procedure.

After completing the relocations for all UEs that it has served, the old CCNF 912 can release the PDU session established with the UPNF1 via the SM1 914 at step 970.

(Embodiment 2-3)

Figure 10:
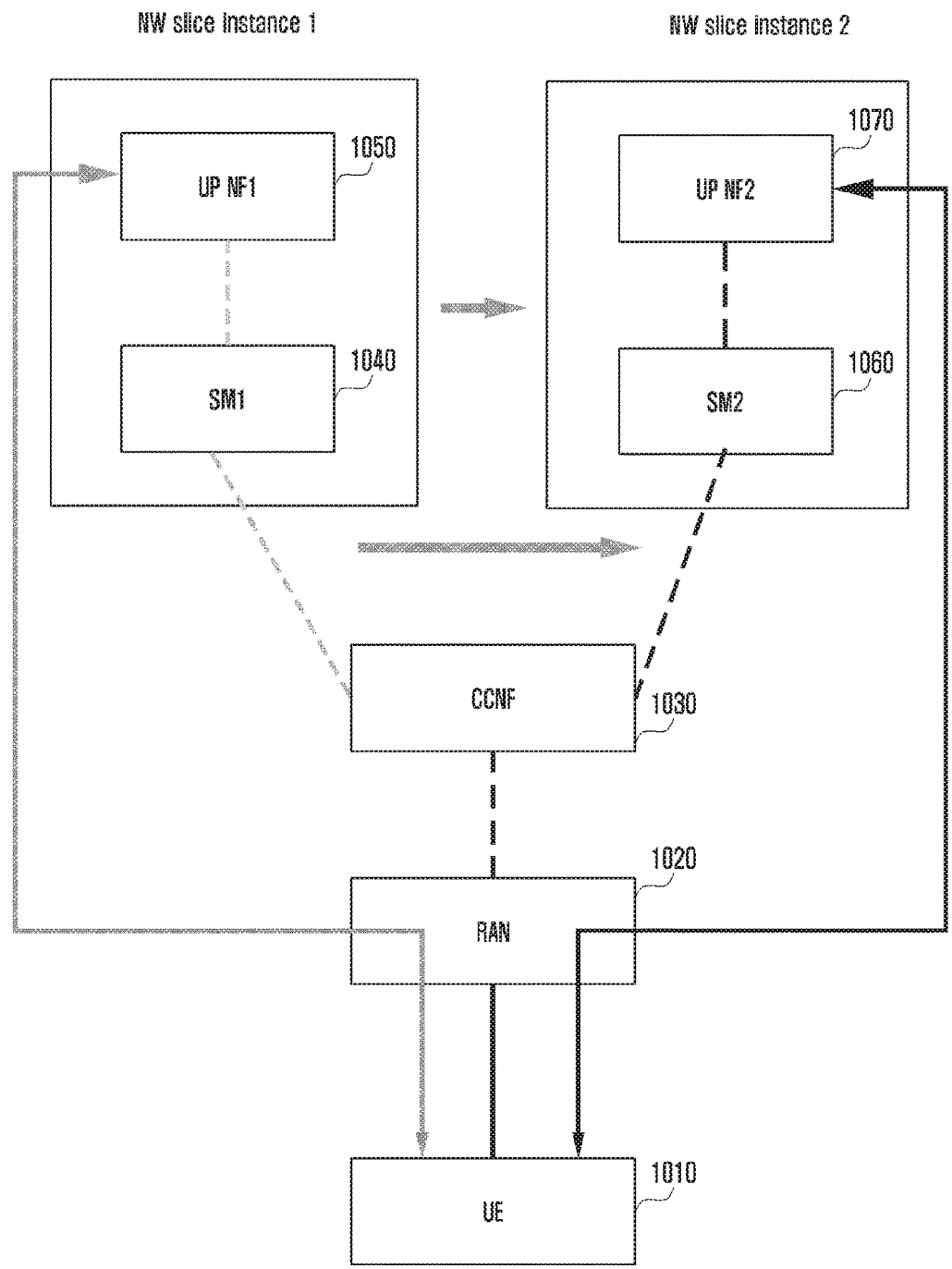
FIG. 10 is a diagram illustrating relocation to a different network slice instance in same CCNF according to an embodiment of the present disclosure.
Figure 11:
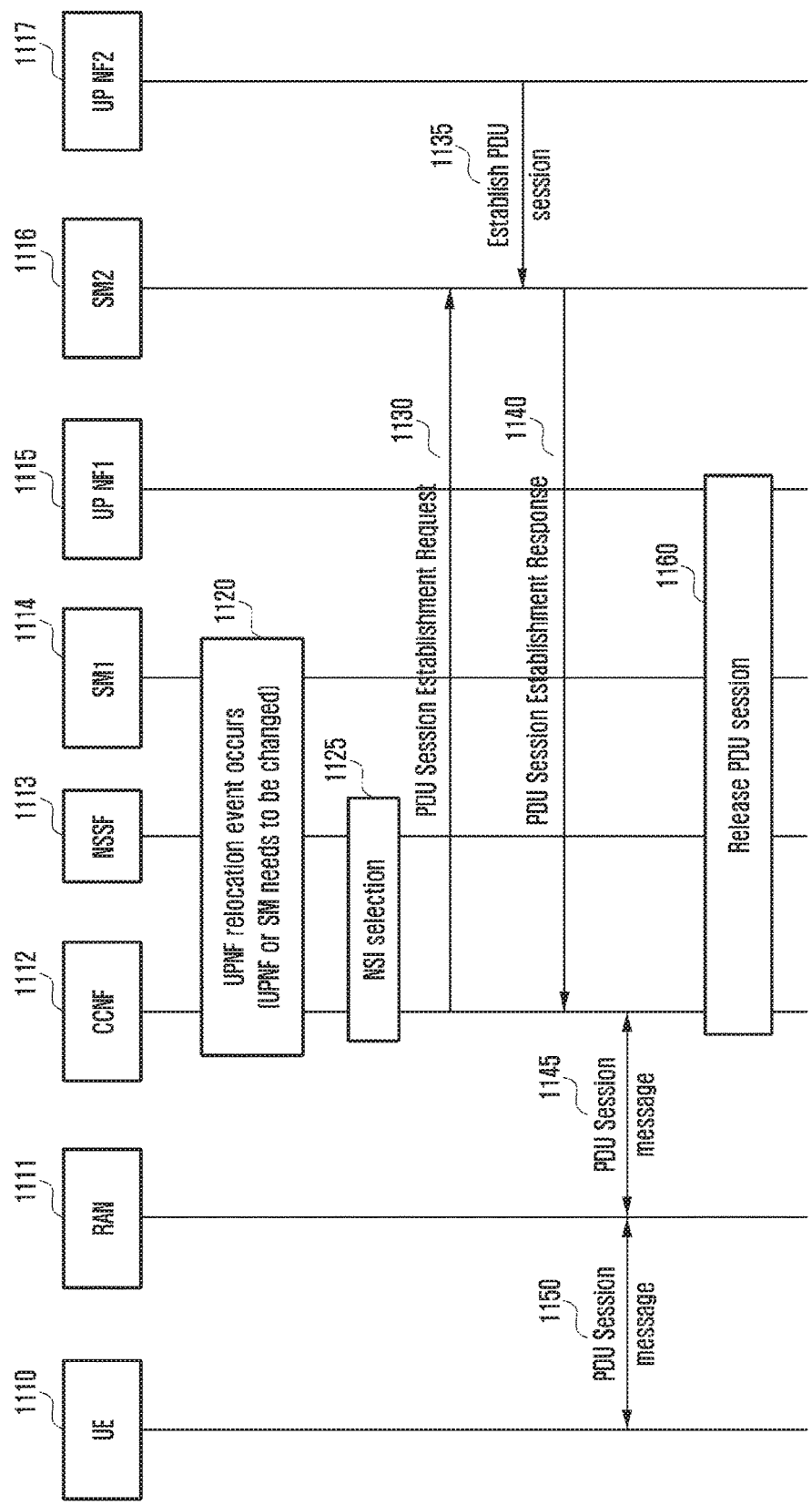
FIG. 11 is a signal flow diagram illustrating a method for relocation to a different network slice instance in same CCNF according to an embodiment of the present disclosure.

Embodiment 2-3 is described with reference to FIGS. 10 and 11. FIG. 10 is a diagram illustrating a configuration of a network according to an embodiment of the present disclosure, and FIG. 11 is a signal flow diagram illustrating signal flows among network entities in the network of FIG. 10.

FIG. 10 is a diagram illustrating relocation to a different network slice instance in same CCNF according to an embodiment of the present disclosure.

FIG. 10 depicts a situation as follows.

A UE 1010 is receiving a 5G network service hosted by a CCNF 1030 via an RAN 1020, the CCNF 1030 serving the UE 1010 as part of the network slice instance 1 in the state of being connected to a UPNF1 1050 via an SM1 1040.

At a certain time, it may occur that the SM1 1040 and UPNF1 1050 encounter an overload situation, a congestion situation, or a network failure situation, because of the increase of the number of UEs to be served. Here, the network failure situation may occur when the SM1 1040 or UPNF1 1050 stops working because of a problem of network facility, physical breakdown of network facility, and process stop caused by a software error. According to this embodiment, the CCNF 1030 offloads the UE 1010 to a new SM2 1060 and a new UPNF2 1070 for service continuity in such a situation.

It may also be possible to exemplify a situation where the UE 1010 moves from one area covered by SM1 1040 and UPNF1 1050 to another covered by SM2 1060 and UPNF2 1070. In this case, it may be necessary to relocate the session context and connectivity of the UE 1010 to the SM2 1060 covering the new area for service continuity to the UE 410. The SM1 1040/UPNF1 1050 and the SM2 1060/UPNF2 1070 can be deployed to cover different areas in an area-specific manner, and the SM/UPNF relocation can take place between neighboring SMs/UPNFs to reduce latency of signaling to the UE 1010.

FIG. 10 depicts a situation where the CCNF 1030 supports a new network slice instance and thus switches the connection from the SM1 1040/UPNF1 1050 to the SM2 1060/UPNF2 1070 that supports the corresponding NSI. If the SM1 1040 connected to the CCNF 1030 is changed for the SM2 1060, this means change of network slice instance; thus, the PDU session connection information of the UE 1010 should be set up in the new network slice instance.

FIG. 11 is a signal flow diagram illustrating a method for relocation to a different network slice instance in same CCNF according to an embodiment of the present disclosure.

In FIG. 11, an SM/UPNF relocation is triggered by an SM/UPNF relocation event, the SM/UPNF relocation procedure being performed in such a way of changing network slice instance along with NSI re-assignment. At step 1120, the CCNF 1112 can detect an SM/UPNF relocation necessity situation. The CCNF 1112 can determine whether SM/UPNF relocation is necessary as follows.

- The CCNF 1112 can receive a command instructing relocation to a new SM (SM2) 1116 because the old SM (SM1) 1114 is in an overload situation, the command being transmitted by an operating and management entity (OAM) (not shown), i.e., a network management entity. Here, the OAM can notify the CCNF 1112 of the address or name of a new SM1 1116 as a relocation target.
- The SM1 1114 can check a number of UEs it serves and, if the number of UEs is equal to or greater than a predetermined threshold, determine that it is in an overload situation or a congestion situation. The maximum number of UEs the SM1 1114 can serve can be preconfigured or received from the OAM.
- The CCNF 1112 can detect UE mobility and check the current location of the UE 1110 for cell ID or location management unit (e.g., tracking area) to determine whether relocation to the neighboring UPNF (UPFN2) 1117 or a UPNF preconfigured to serve the UE 1110 at the corresponding location is necessary.
- It may occur that the service continuity level or session continuity level of the UE 1110 changes. The CCNF 1112 can detect the change of the service continuity level or session continuity level based on a request from the UE 1110 or a notification of change of the service continuity level or session continuity level of the NSI for the UE 1110 which is transmitted by a subscription server (not shown) of the network or the OAM when the subscription of the UE 1110 is changed. The CCNF 1112 can determine whether it supports the requested mobility level and, if it cannot support the mobility level, determine the necessity of CCNF relocation. The SM1 1114 which has been connected to the CCNF 1112 determines whether it supports the target service continuity level or session continuity level and, if not, determines that it is necessary to perform SM/UPNF relocation.

After detecting the necessity of UPNF relocation at step 1120, the CCNF 1112 can discover a new SM 1116 as the best SM at step 1125. As exemplified in the description of step 1120, the CCNF 1112 can select the target SM based on the SM address or name or the NSI ID transmitted by the OAM. In the case that the CCNF 1112 has a list of SMs taking charge of specific areas, it can select the best SM based on the changed location of the UE 1110. Or, in the case that the CCNF 1112 has a list of SMs supporting the service continuity levels or session continuity levels that the old SM 1114 cannot support, the CCNF 1112 can discover a new SM (SM2) 1116 supporting the changed continuity level or session continuity level or a target continuity level or session continuity level of the UE 1110. Alternatively, the CCNF 1112 can negotiate with an NSSF 1113 to select an NSI. The NSSF 1113 can be an independent entity or a function collocated with the CCNF 1112. The CCNF 1112 can request to the NSSF 1113 for NSI selection based on the information acquired at step 1120 to determine an SM and a UPNF to connect. It may also be possible to transmit information on a specific area, changed service continuity level or session continuity level of the UE 1110, or a name or address of the relocation target SM to the NSSF 1113 to be assigned a corresponding NSI ID or SM.

After selecting the SM2 1116 at step 1125, the CCNF 1112 can transmit a PDU Session Establishment Request message to the SM2 116 at step 1130. The PDU Session Establishment Request message can include the context of the session for the UE 1110. The session context can include the information on the QoS of the session for the UE 1110, service continuity, session continuity, and charging policy. The PDU Session Establishment Request message also can include an NSI ID received from the NSSF 1113. If the PDU Session Establishment Request message is received, the SM2 1116 can determine the NSI for establishing a PDU session based on the information included in the PDU Session Establishment Request message. The PDU Session Establishment Request message includes a tunneling endpoint ID of the RAN to which the UE 1110 is connected; thus, the SM2 1116 can transmit the tunneling endpoint ID of the RAN 1111 to the UPNF2 1117 to establish a tunnel between the UPNF2 1117 and the RAN 1111. The PDU Session Establishment Request message transmitted to the SM2 1116 can include information on the UE 1110 or all UEs being served by the CCNF 1112. Here, it may be possible to use a temporary ID of the UE 1110, an NSI ID newly allocated to the UE 1110, and a session ID for identifying the PDU session for the UE 1110. It also can be possible for the SM2 1116 to use the session ID used by the SM1 1114.

At step 1135, the SM2 can select the UPNF2 1117 in consideration of the location of the UE 1110, session context, and charging policy and establish a PDU session. Step 1135 can be performed for all UEs being serviced by the CCNF 1112.

At step 1140, the SM2 can transmit to the CCNF 1112 a PDU Session Establishment Response message including the information on the established PDU session in response to the PDU Session Establishment Request message received at step 1130. The PDU Session Establishment Response message can include the tunneling endpoint ID of the allocated UPNF2 1117, QoS information on the service that the RAN 1111 will provide to the UE 1110, a continuity level of the session, and the session ID allocated to the UE 1110. The PDU Session Establishment Response message can be transmitted in response to every PDU Session Establishment Request message transmitted by all UEs).

If the PDU Session Establishment Response message is received, the CCNF 1112 may transmit a Session Management message to the RAN 1111 at step 1145 to continue the PDU session establishment procedure. The RAN 1111 can perform a bearer establishment procedure with the UE 1110 at step 1150; and, if the bearer establishment procedure is completed, a PDU session can be established between the UE 1110 and the UPNF 1117 via the RAN 111.

At step 1160, the CCNF 1112 can release the PDU session established with the SM1 1114 upon noticing the establishment of a PDU session between the SM2 1116 and the UPNF2 1117 or after a predetermined time elapses (or a timer expires). The reason why the CCNF 1112 maintains the PDU session established with the SM1 1114 during a predetermined period is that the UE 1110 may go back to the previous location to be served by the SM1 1114.

<Embodiment 3>

This embodiment proposes a method of defining a virtualized network slice. A network slice can be created for providing a service requested by the user. That is, a network slice can be created with the network entities used for fulfilling the requests of a service such as an eMBB service, an IoT, and a critical service. Also, a network slice can be created per QoS of the user.

According to an embodiment of the present disclosure, a network slice can be created per UE capability. That is, it may be possible to create a network slice according to the mobility level of the UE (e.g., no mobility, low mobility, high mobility, and dynamic mobility). A network slice can be created with network entities close to the UE.

According to an embodiment of the present disclosure, a network slice can be created in consideration of network management aspects. For example, it can be possible to create a roaming-dedicated network slice for supporting roaming UEs. The roaming-dedicated network slice can be created in both the home and visited networks, and the roaming-dedicated slice can be created differently in the home and visited networks.

According to an embodiment of the present disclosure, a network slice can be created by reflecting requests for resources regardless of service, UE capability, and network management. That is, it can be possible to reflect requested mobility level, QoS level, UE location, interesting service, bandwidth, and least latency constraints.

Figure 12:
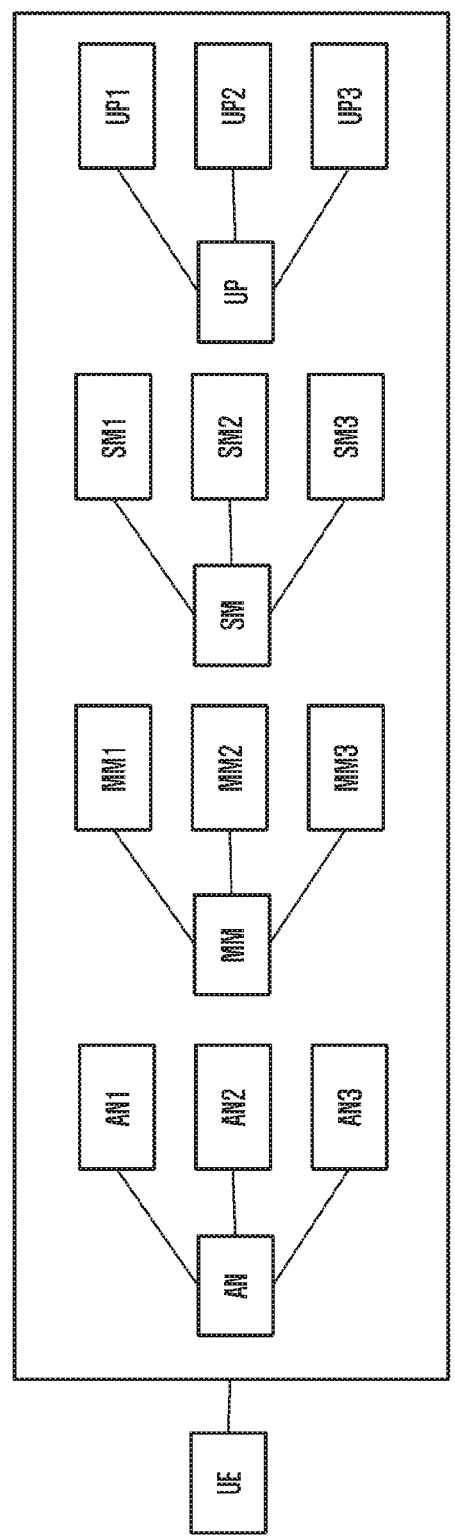
FIG. 12 is a diagram illustrating a network slice created with virtualized network entities according to an embodiment of the present disclosure.

FIG. 12 is a diagram illustrating a network slice created with virtualized network entities according to an embodiment of the present disclosure.

According to an embodiment of the present disclosure, a network slice can be comprised of virtualized network entities. FIG. 12 depicts a network slice composed of virtualized network entities. A UE connects to the virtualized network slice, and the real entities for providing network service to the UE can be determined by the virtual nodes of the network.

That is, the UE can be aware of the virtual nodes such as access node (AN), mobility management (MM), session management (SM), and user plane (UP), and the physical entities may be one of multiple ANs (AN1, AN2, and AN3), one of multiple MMs (MM1, MM2, and MM3), and one of multiple UPs (UP1, UP2, and UP3). Although the drawing exemplifies a case where three virtual entities are created per physical entity, the number of virtual entities per physical entity may be greater or less than 3.

Figure 13:
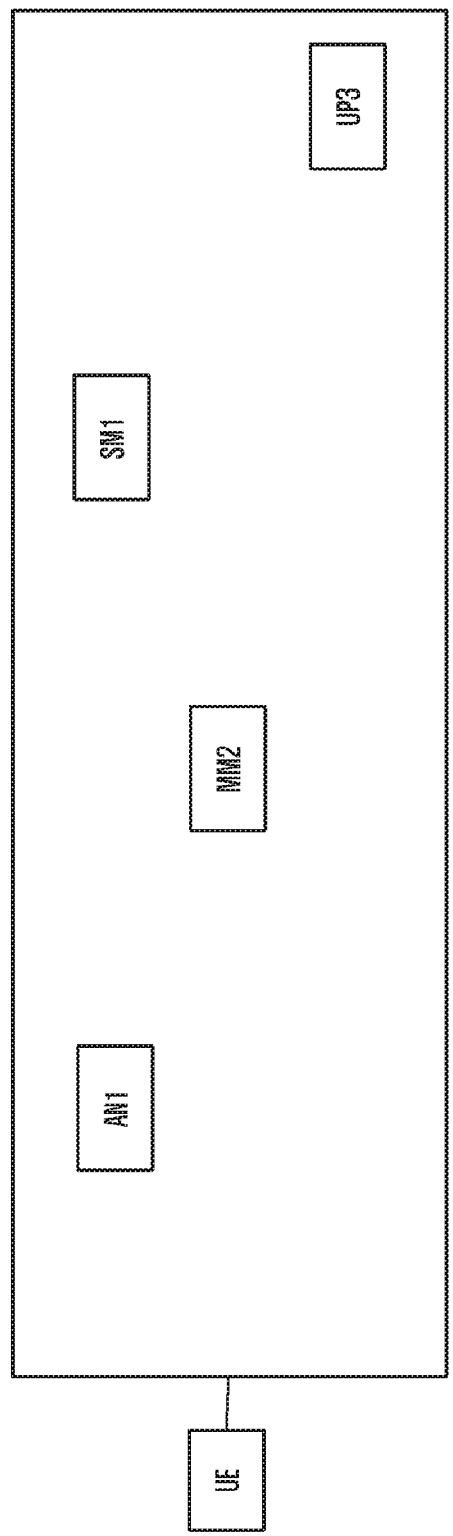
FIG. 13 is a diagram illustrating a network slice comprised of physical network entities according to an embodiment of the present disclosure.

FIG. 13 is a diagram illustrating a network slice comprised of physical network entities according to an embodiment of the present disclosure.

According to an embodiment of the present disclosure, the network slice may be comprised of physical entities for providing the network service to the UE. FIG. 13 depicts a network slice comprised of physical network entities. The UE can be served by the network slice comprised of AN1, MM2, SM1, and UP3.

An embodiment of the present disclosure proposes information that the UE provides for creating a network slice. The UE can provide the information on the service in which the user is interested. The UE can provide the UE capability information such as mobility level and IP version. The UE can also provide user information such as current location and subscription. The network can create a network slice based on the information provided by the UE.

FIG. 14 is a diagram illustrating network slice management tables for explaining slice information update according to an embodiment of the present disclosure.

According to an embodiment of the present disclosure, the network slices may be preconfigured in the network. FIG. 14 depicts a network slice management table listing three network slices (NSI#1, NSI#2, and NSI#3) preconfigured in the network. The NSW can be configured to provide the eMBB service.

If it becomes necessary to provide the IoT service as time goes by, the network can designate one of the preconfigured network slices for the IoT service. FIG. 14 exemplifies a case where the NSI#2 is designated for IoT. If it becomes unnecessary to provide the eMBB service or infeasible to provide the eMBB service any more, the network can deactivate the eMBB service in the NSI#1. Even when the eMBB service is deactivated, the NSW can be maintained. Although FIG. 14 exemplifies a case where three network slices are managed in the network slice management table, the number of network slices can be less or greater than 3.

Figure 15:
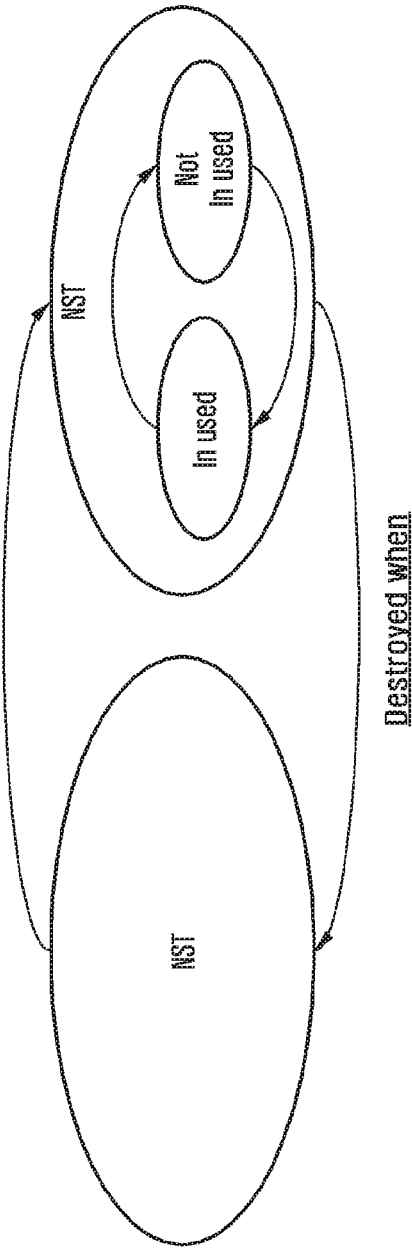
FIG. 15 is a state transition diagram illustrating state transition of a network slice between activated and deactivated states according to an embodiment of the present disclosure.

FIG. 15 is a state transition diagram illustrating state transition of a network slice between activated and deactivated states according to an embodiment of the present disclosure.

According to an embodiment of the present disclosure, if a UE requests for a service, the network can trigger state transition of a network slice from the deactivated state to the activated state. It may also be possible for the network to activate the network slice autonomously. FIG. 15 shows a state transition of a network slice from the deactivated state to the activated state. The network slice can be pre-defined and newly created. The network slice can be created in response to a request from the UE (e.g., service request) or the network (e.g., handover). The expression "created" is intended to mean that an NSI is created or that a pre-created NSI is mapped to a service.

According to an embodiment of the present disclosure, the network can manage the number of users being served by a network slice and start a timer when the number of users becomes zero. If there is no user being served by the corresponding network slice until the timer expires, the network can deactivate (or destroy) the network slice. For the purpose of load balancing, the network may decrease the number of network slices with low demand and increase the number of network slices with high demand (e.g., decrease of peak service time or number of NSIs created for a service with low demand, and increase of number of NSIs created for a service with high demand). FIG. 15 also shows a state transition from the activated state to the deactivated state. Here, the expression "destroyed" is intended to mean that an NSI is actually destroyed or that the NSI-service mapping information is deleted.

Figure 16:
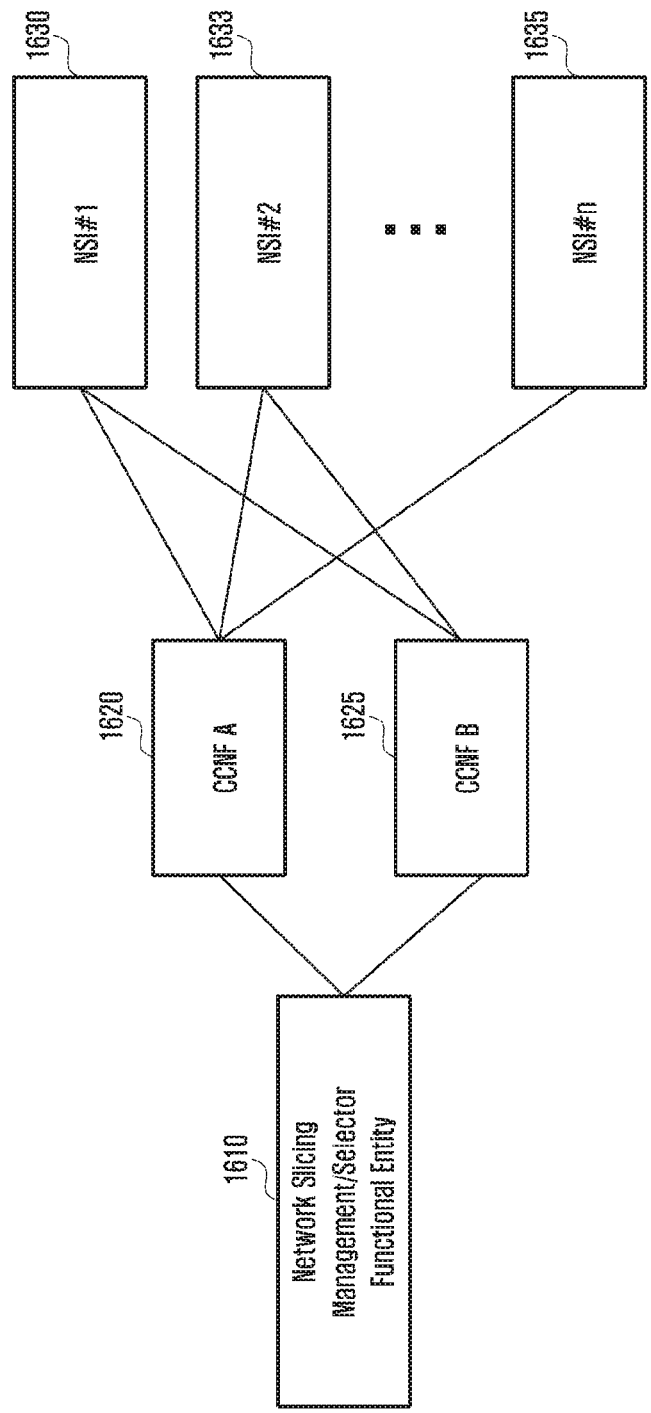
FIG. 16 is a diagram illustrating a configuration of a central network slice management function/node according to an embodiment of the present disclosure.

FIG. 16 is a diagram illustrating a configuration of a central network slice management function/node according to an embodiment of the present disclosure.

According to an embodiment of the present disclosure, the network can define a central entity node for managing network slices. FIG. 16 depicts a network slicing management/selector functional entity (NSMSF) 1610 that may manage information on the slices of the mobile communication operator as described with reference to FIG. 14.

Each of CCNFs 1620 and 1625 can request to the NSMSF 1610 for information related to the slice and acquire the information. For example, the CCNF A 1620 requested an eMBB and mIoT slices from a UE can request the NSMSF 1610 about whether eMBB and mIoT slices are available. The NSMSF 1610 can determine whether there is a network slice instance supporting the eMBB and mIoT currently based on the network slice instance information (NSI#1, NSI#2, . . . , NSI#n). For example, if the NSW 1630 support the eMBB slice and NSI#2 1633 support the mIoT slice, the NSMSF 1610 may send to the CCNF A 1620 the information on the NSW 1630 and the NSI#2 1633 in reply. Then, the CCNF A 1620 can notify the UE that the eMBB and mIoT slices are available. If it is determined that the there is a network slice instance supporting the eMBB slice and there is no network slice instance supporting the mIoT slice, the NSMSF 1610 can send to the CCNF A 1620 the information on the NSW 1630 supporting the eMBB slice along with the information indicating that there is no network slice instance supporting the mIoT slice. Then the CCNF A 1620 can notify the UE that the eMBB slice is available and the mIoT slice is not available. The CCNF A 1620 receiving the slice instance information from the NSMSF 1610 connects the slice instance (e.g., NSI#1 1630 and NSI#2 1633), and provides the slice service to the UE.

If it is determined by the NSMSF 1610 that the current CCNF A 1620 cannot support the requested slices and the another CCNF (CCNF B) 1625 can support the requested slices, the NSMSF 1610 can send the CCNF A 1620 the information that the CCNF B 1625 can host the network slice instances supporting the eMBB and mIoT slices along with information on the corresponding network slice instances (e.g., NSI#1 1630 an NSI#2 1633) in reply. Then the CCNF A 1620 can transfer the service request received from the UE to the CCNF B 1625 based on the information received from the NSMSF 1610. The CCNF B 1625 can notify the UE that the CCNF B 1625 can host the network slice instances for the eMBB and mIoT slices. One NSI may be comprised of network functions (NFs) such as user plane functions (UPF) and a network repository function (NRF).

Figure 17:
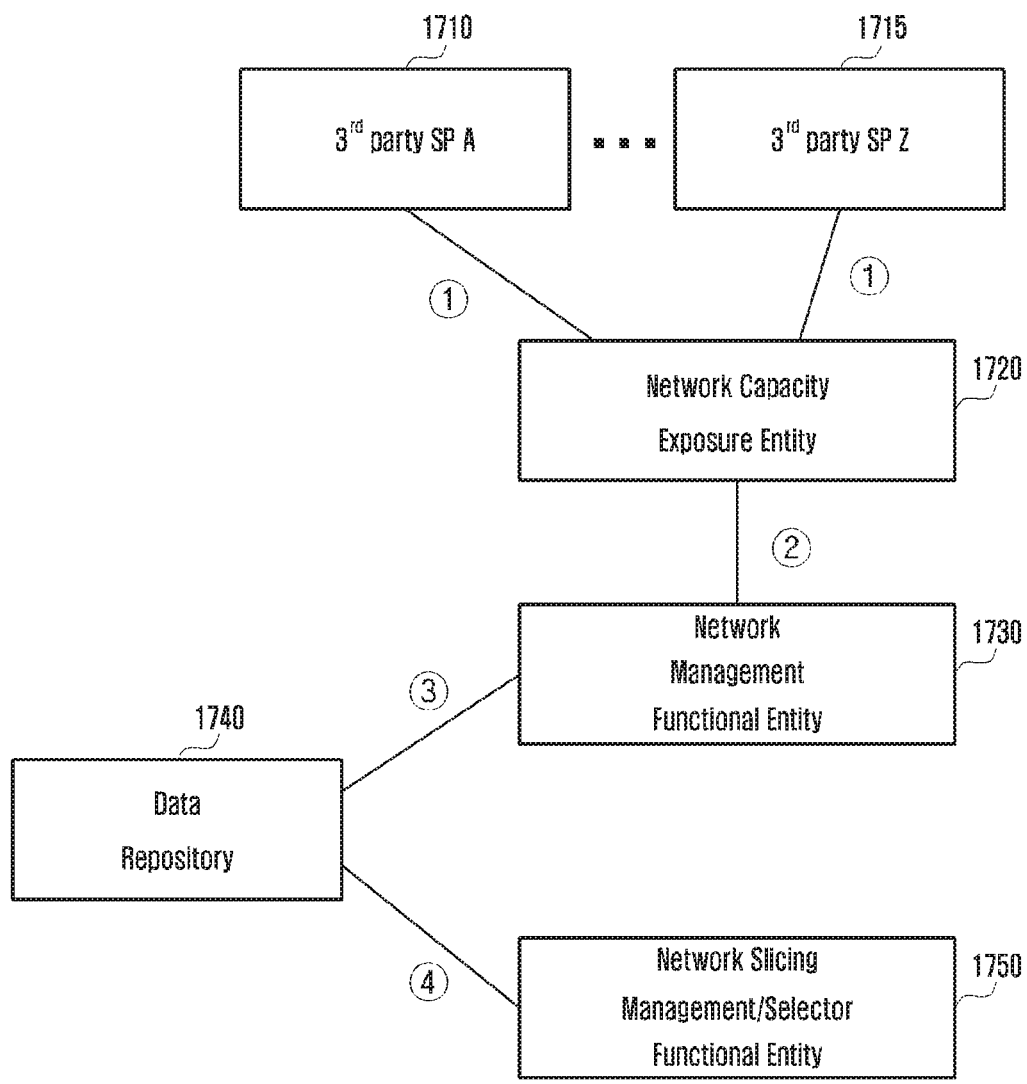
FIG. 17 is a diagram illustrating a configuration of a network slice for supporting by a 3rd party service provider according to an embodiment of the present disclosure.

FIG. 17 is a diagram illustrating a configuration of a network slice for supporting by a 3rd party service provider according to an embodiment of the present disclosure.

An embodiment of the present disclosure provides a method for creating a network slice for a 3rd party provider rather than the network operator.

In reference to FIG. 17, it may be possible to create a network slice for supporting a service provided by a third-party provider.

Third party service providers (SPs), i.e., SP A 1710 and SP Z 1715, can provide a network capacity exposure entity (NCEE) 1720 with resource parameters of intended network slice templates (NSTs) through interface ①. The resource parameters can include mobility level, QoS level, latency, requested service components (e.g., MBMS ProSe), service area, target user subscription, and service ID (or type). The service ID can be determined by the third-party SPs or allocated by the NCEE 1720, the allocated service ID being transmitted to the corresponding third-party SPs 1710 and 1715.

The NCEE 1720 can communicate with a network management function entity (NMFE) through interface ② to generate an NST. The NMFE 1730 can store the generated NST in a data repository (e.g., HSS) 1740 through interface ③ The third-party SPs 1710 and 1715 can exchange the service ID (or service type) information with a UE. Also, a mobile network operator (MNO) can transmit the corresponding service information to the UE through an open mobile alliance device management (OMA DM) when the UE attaches to the network.

If the UE requests for the corresponding service ID through interface ④, the network can check the subscription of the UE and confirm whether using the service is available. The network slicing management/selector function entity 1750 can obtain the NST information form the data repository 1740 to generate and provide the NSI to the UE. Or the network slicing management/selector function entity 1750 can create the NSI in advance even if there is no request from the UE.

According to an embodiment of the present disclosure, a radio link of a radio network to which a UE connects can provide information of service provided by the link or a core network connected with the link. In order to manage the corresponding information, it may be possible to add the information of the radio link providing service connected each network slice to the table of FIG. 14.

According to an embodiment of the present disclosure, the method of transmitting the information to the UE includes that the RAN transmits the system information block (SIB) information comprising information of supporting network slice or service or resource information. This information can be mapped to a cell ID of the radio link. The cell ID is similar to E-UTRAN Cell Global Identifier (eCGI) of EPC. This information can be mapped to an RAT node ID of a radio link. The RAT node ID is similar to an evolved Node B (eNB) ID of EPC. This information can be mapped to an area-specific ID of a radio link. An example of the area-specific ID is TAI or TAI list. In order to provide this information, it may be possible to define a new identifier for identifying NSI being supported by a new RAN.

According to an embodiment of the present disclosure, a UE cannot know the information, and can connect to any radio link available. The radio link or core network detecting the connection of the UE can change the path in order for the network to connect an appropriate radio link. In detail, in the case that the radio link changes the path, the UE can transmit to the network information on RAT nodes (e.g., eNB) available for connection, and the RAT node selects a RAT among the RAN nodes supporting the network slice and transmits the selected RAT information to the UE. The UE can connect to the RAT node notified by the network based on the corresponding information. In the case that the core network changes the path, upon receipt of the service request from the UE, the core network communicates with a network slice management node to select an RAT supporting the corresponding network slice based on the information on the network slice requested by the UE and the UE location information. The core network can provide the UE with the corresponding information or trigger handover of the UE to the corresponding area.

A network slice can be divided into two functions: common function not limited to any service or service-specific function dedicated to a specific service. According to an embodiment of the present disclosure, the common function can define the services it supports such that a UE subscribed to the corresponding service accesses to the common function for use of the service-specific function. The core network can establish a connection with an RAN and provide the RAN with the information on the services available with the common function. The RAN can route a message to the common function of the core network, which is capable of providing the service requested by the user based on previously acquired information in the UE's initial attach procedure. If the UE connects to the network through this procedure, it may communicate with a common function for receiving the service afterward.

Figure 18:
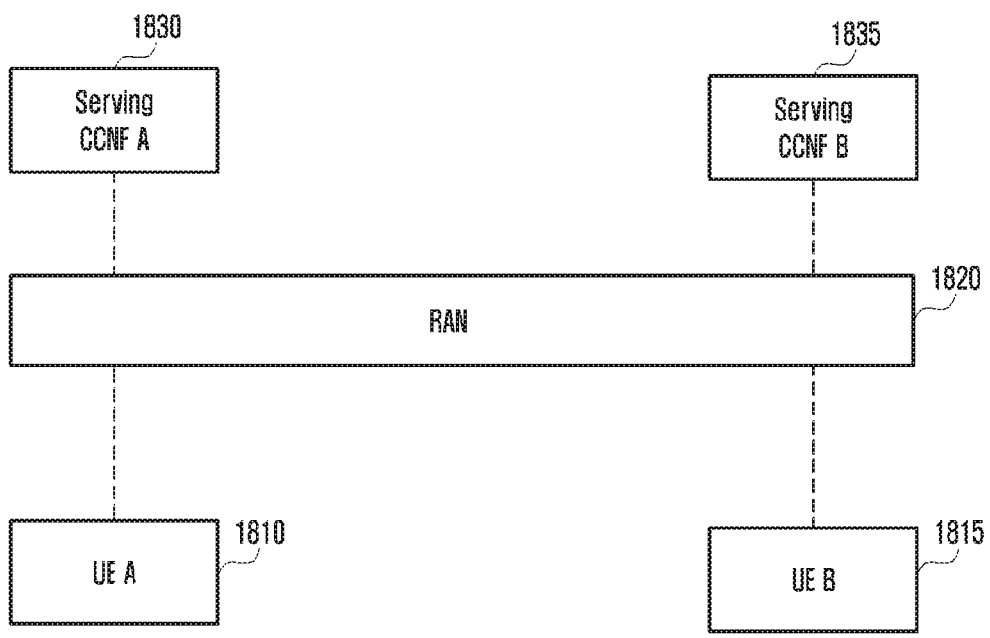
FIG. 18 is a diagram illustrating a method for configuring a common function of the network and assigning the common function to a UE according to an embodiment of the present disclosure.

FIG. 18 is a diagram illustrating a method for configuring a common function of the network and assigning the common function to a UE according to an embodiment of the present disclosure.

In the embodiment of FIG. 18, the network may provide UEs 1810 and 1815 with a rule for assigning an appropriate common function. That is, the network may manage the common function per service and assign a common function based on the requested service or subscription information of the UE. In FIG. 18, a CCNF A 1830 can provide eMBB and critical communications (CriC) services, and a CCNF B 1835 can provide eMBB and IoT services. In this case, the UE A 1810 having a subscription to the eMBB and CriC services connects to the CCNF A 1830 via an RAN 1820, and the UE B 1815 having a subscription to the eMBB and IoT services connects to the CCNF B 1835 via the RAN 1820.

The network can manage the common function per mobility level to assign the common function according to the mobility levels of the UEs 1810 and 1815. That is, a UE with almost no mobility such as a laptop computer and a UE with a high mobility such as a smartphone can be assigned the common function separately. In FIG. 18, the CCNF A 1830 may not support mobility, while the CCNF B 1835 may support mobility. Accordingly, the UE A with no mobility such as a TV may preferably connect to the CCNF A 1830, and the UE B with mobility such as a smartphone may preferably connect to the CCNF B 1835.

Figure 19:
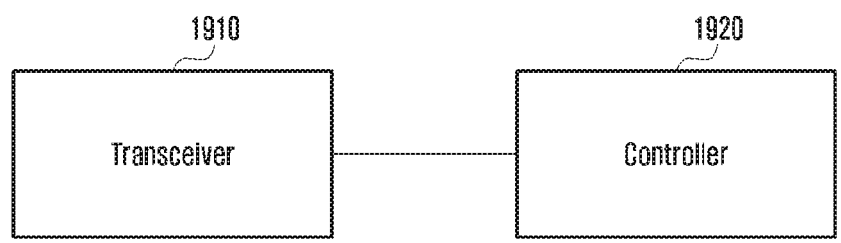
FIG. 19 is a block diagram illustrating a configuration of a CCNF according to an embodiment of the present disclosure.

The network may manage the common function in a location-based manner to assign the common function to the UEs 1810 and 1815. That is, a UE connected to the network in the Seoul area can be assigned the common function of the Seoul area, while a UE connected to the network in the Busan area may be assigned the common function of the Busan area. In FIG. 19, the CCNF A 1830 can be located in Seoul, and the CCNF B 1835 can be located in Busan. In this case, the UE A 1810 located in Seoul can connect to the CCNF A 1830, and the UE B 1815 located in Busan can connect to the CCNF B 1835. If the UE A 1810 located in the Seoul area moves to the Busan area, the connection to the CCNF A 1830 can be switched to the CCNF B 1835.

FIG. 19 is a block diagram illustrating a configuration of a CCNF according to an embodiment of the present disclosure.

In reference to FIG. 19, the CCNF according to an embodiment of the present disclosure includes a transceiver 1910 and a controller 1920 for controlling overall operations of the CCNF.

The controller 1920 of the CCNF can control the CCNF to perform the operation of one of the above-described embodiments. For example, the controller 1920 connects to the transceiver 1910 and can detect a CCNF relocation necessity situation, select a new CCNF, transmit a CCNF relocation request message including information on the UE it has served to the new CCNF, receive a CCNF relocation response message from the new CCNF, and perform a location update procedure with the UE according to a predetermined condition. The controller 1920 can control the transceiver 1910 to transmit to the UE a CCNF relocation notification message including the information triggering a UE location update procedure and information on the new CCNF. The controller 1920 also can control the transceiver 1910 to receive a location update request message from the UE and transmit to the UE a location update rejection message including information indicating location update rejection and information on the new CCNF. The controller 1920 also can control the transceiver 1910 to receive the location update request message and forward the location update request message to the new CCNF.

The transceiver 1910 of the CCNF may transmit/receive signals according to the operation of one of the above-described embodiments.

Although depicted as separate modules, the controller 1920 and the transceiver 1910 can be implemented in the form of a single chip. The controller 1920 and the transceiver 1910 can be electrically connected to each other.

The controller 1920 may be a circuit, an application-specific circuit, or at least one processor. The operations of the CCNF may be realized with a memory device storing program codes corresponding to the operations, the memory device being mounted in an arbitrary component of the CCNF. That is, the controller 1920 may read and execute the program codes stored in the memory device to carry out the above-described operations.

Figure 20:
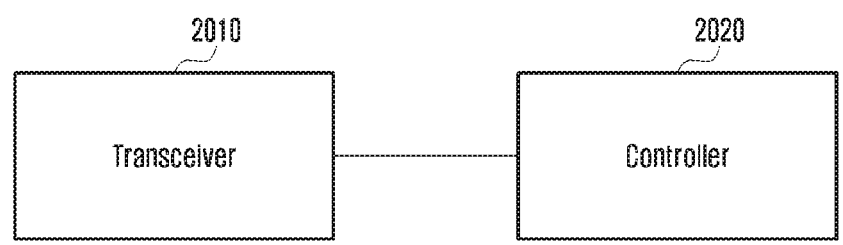
FIG. 20 is a block diagram illustrating a configuration of a UE according to an embodiment of the present disclosure.

FIG. 20 is a block diagram illustrating a configuration of a UE according to an embodiment of the present disclosure.

In reference to FIG. 20, the UE according to an embodiment of the present disclosure includes a transceiver 2010 and a controller 2020.

The controller 2020 can control the UE to perform the operation of one of the above-described embodiments.

The transceiver 2010 can transmit/receive signals according to the operation of one of the above-described embodiments.

Although depicted as separate modules, the controller 2020 and the transceiver 2010 can be implemented in the form of a single chip. The controller 2020 and the transceiver 2010 can be electrically connected to each other.

The controller 2020 can be a circuit, an application-specific circuit, or at least one processor. The operations of the UE can be realized with a memory device storing program codes corresponding to the operations, the memory device being mounted in an arbitrary component of the CCNF. That is, the controller 2020 can read and execute the program codes stored in the memory device to carry out the above-described operations.

As described above, embodiments of the present disclosure are advantageous in terms of increasing the number of IoT terminals that are simultaneously capable of accessing data transmission service over a mobile communication network.

Also, embodiments of the present disclosure are advantageous in terms of improving radio resource utilization efficiency by allowing an application server to transmit data to a large number of IoT terminals in a multicast/broadcast fashion rather than a unicast fashion.

Also, embodiments of the present disclosure are advantageous in terms of allocating radio resources efficiently in adaptation to the network condition by making a radio resource allocation decision based on whether to multicast/broadcast data for IoT terminals gathered in a small area.

Also, embodiments of the present disclosure are advantageous in terms of allowing a 5G mobile communication system operator or a 5G mobile communication terminal to cope with CCNF rearrangement caused by a network congestion/failure, change of network service constraints (e.g., terminal's mobility level change, authentication mechanism change, and network slice change), or mobility of the terminal.

Also, embodiments of the present disclosure are advantageous in terms of meeting various service constraints by efficiently managing constrained radio links and network resources according to a network virtualization and resource allocation and management method proposed for use in a wireless communication system.

Also, embodiments of the present disclosure are advantageous in terms of providing stable QoS per terminal and facilitating management of radio resource and network resource efficiently by allocating a network slice supporting a service of the terminal when the terminal is attached to a visited operator's network in roaming environment.

In the embodiments of the present disclosure, the components are described in singular or plural forms depending on the embodiment. However, the singular and plural forms are selected appropriately for the proposed situation just for explanatory convenience without the intension of limiting the present disclosure thereto; thus, the singular form includes the plural form as well, unless the context clearly indicates otherwise.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method of a common control network function (CCNF), the method comprising:
    detecting a CCNF relocation necessity situation;
    determining a new CCNF;
    transmitting a CCNF relocation request message including information on a terminal being served by the CCNF to the new CCNF;
    receiving a CCNF relocation response message from the new CCNF; and
    performing a location update procedure with the terminal according to a predetermined condition.

2. The method of claim 1, wherein performing the location update procedure comprises transmitting a CCNF relocation notification message including information triggering location update of the terminal and information on the new CCNF.

3. The method of claim 1, wherein performing the location update procedure comprises:
    receiving a location update request message from the terminal; and
    transmitting a location update reject message including information rejecting the location update request and information on the new CCNF.

4. The method of claim 1, wherein performing the location update procedure comprises:
    receiving a location update request message from the terminal; and
    forwarding the location update request message to the new CCNF.

5. The method of claim 1, wherein detecting the CCNF relocation necessity situation comprises determining CCNF relocation necessity based on at least one of whether a CCNF relocation command is received from an operating and management entity (OAM), whether a number of terminals being served by the CCNF is equal to or greater than a predetermined value, whether CCNF relocation is necessary based on location of the terminal, or whether CCNF relocation is necessary according to change of a mobility level of the terminal.

6. The method of claim 1, wherein determining the new CCNF comprises selecting the new CCNF based on a CCNF address or name received from an operating and management entity (OAM), selecting the new CCNF from a list of CCNFs based on a changed location of the terminal, or selecting the new CCNF from the list of CCNFs based on a mobility level supported by the new CCNF.

7. A communication method of a terminal, the method comprising:
    receiving, from a first common control network function (CCNF), a CCNF relocation notification message including information triggering a terminal location update procedure and information on a second CCNF in a situation requiring CCNF relocation; and
    transmitting a location update request message to the second CCNF.

8. The method of claim 7, wherein the CCNF relocation notification message includes a temporary ID allocated to the terminal.

9. The method of claim 7, further comprising:
    transmitting a location update request message to the first CCNF before receiving the CCNF relocation notification message; and
    transmitting, when a location update reject message including information on the second CCNF is received from the first CCNF, the location update request message to the second CCNF.

10. The method of claim 7, further comprising:
    transmitting a location update request message to the first CCNF before receiving the CCNF relocation notification message; and
    receiving, from the second CCNF, a location update response message transmitted in response to the location update request message that the first CCNF forwards to the second CCNF.

11. A common control network function (CCNF), comprising:
    a transceiver configured to transmit and receive signals; and
    a controller coupled with the transceiver and configured to:
        detect a CCNF relocation necessity situation;
        determine a new CCNF;
        transmit a CCNF relocation request message including information on a terminal being served by the CCNF to the new CCNF and receive a CCNF relocation response message from the new CCNF; and
        perform a location update procedure with the terminal according to a predetermined condition.

12. The CCNF of claim 11, wherein the controller is further configured to transmit a CCNF relocation notification message including information triggering location update of the terminal and information on the new CCNF.

13. The CCNF of claim 11, wherein the controller is further configured to:
    receive a location update request message from the terminal; and
    transmit a location update reject message including information rejecting the location update request and information on the new CCNF.

14. The CCNF of claim 11, wherein the controller is further configured to receive a location update request message from the terminal and forward the location update request message to the new CCNF.

15. The CCNF of claim 11, wherein the controller is further configured to determine CCNF relocation necessity based on at least one of whether a CCNF relocation command is received from an operating and management entity (OAM), whether a number of terminals being served by the CCNF is equal to or greater than a predetermined value, whether CCNF relocation is necessary based on location of the terminal, or whether CCNF relocation is necessary according to change of a mobility level of the terminal.

16. The CCNF of claim 11, wherein the controller is further configured to determine the new CCNF based on a CCNF address or name received from an operating and management entity (OAM), from a list of CCNFs based on a changed location of the terminal, or from the list of CCNFs based on a mobility level supported by the new CCNF.

17. A terminal, comprising:
a transceiver configured to transmit and receive signals; and
a controller coupled with the transceiver and configured to:
receive, from a first common control network function (CCNF), a CCNF relocation notification message including information triggering a terminal location update procedure and information on a second CCNF in a situation requiring CCNF relocation; and
transmit a location update request message to the second CCNF.

18. The terminal of claim 17, wherein the CCNF relocation notification message includes a temporary ID allocated to the terminal.

19. The terminal of claim 17, wherein the controller is further configured to:
transmit a location update request message to the first CCNF before receiving the CCNF relocation notification message; and
transmit, when a location update reject message including information on the second CCNF is received from the first CCNF, the location update request message to the second CCNF.

20. The terminal of claim 17, wherein the controller is configured to:
transmit the location update request message to the first CCNF before receiving the CCNF relocation notification message; and
receive, from the second CCNF, a location update response message transmitted in response to the location update request message that the first CCNF forwards to the second CCNF.

* * * * *